(12) United States Patent
Watanabe et al.

(10) Patent No.: US 11,006,802 B2
(45) Date of Patent: May 18, 2021

(54) VACUUM CLEANER

(71) Applicant: TOSHIBA LIFESTYLE PRODUCTS & SERVICES CORPORATION, Kawasaki (JP)

(72) Inventors: Kota Watanabe, Seto (JP); Hirokazu Izawa, Aisai (JP); Kazuhiro Furuta, Seto (JP); Yuuki Marutani, Nagakute (JP); Yuki Takahashi, Nagoya (JP)

(73) Assignee: TOSHIBA LIFESTYLE PRODUCTS & SERVICES CORPORATION, Kawasaki (JP)

( * ) Notice: Subject to any disclaimer, the term of this patent is extended or adjusted under 35 U.S.C. 154(b) by 664 days.

(21) Appl. No.: 15/503,879

(22) PCT Filed: Aug. 21, 2015

(86) PCT No.: PCT/JP2015/073512
§ 371 (c)(1),
(2) Date: Feb. 14, 2017

(87) PCT Pub. No.: WO2016/031704
PCT Pub. Date: Mar. 3, 2016

(65) Prior Publication Data
US 2017/0273528 A1   Sep. 28, 2017

(30) Foreign Application Priority Data

Aug. 28, 2014   (JP) ............................. JP2014-174321

(51) Int. Cl.
*A47L 9/28* (2006.01)
*A47L 9/00* (2006.01)
*A47L 5/22* (2006.01)
*G05D 1/02* (2020.01)
*H04N 7/18* (2006.01)
*A47L 9/04* (2006.01)

(52) U.S. Cl.
CPC ............... *A47L 9/2826* (2013.01); *A47L 5/22* (2013.01); *A47L 9/00* (2013.01); *A47L 9/009* (2013.01);
(Continued)

(58) Field of Classification Search
CPC . A47L 9/2826; A47L 9/00; A47L 9/28; A47L 5/22; A47L 9/009; A47L 9/0411;
(Continued)

(56) References Cited

U.S. PATENT DOCUMENTS 8,843,245 B2   9/2014   Choe et al.
9,505,127 B2   11/2016   Tsuboi et al.
(Continued)

FOREIGN PATENT DOCUMENTS

CN   1575724 A    2/2005
JP   2000-342496 A   12/2000
(Continued)

OTHER PUBLICATIONS

International Search Report dated Nov. 24, 2015, in PCT/JP2015/073512, filed Aug. 21, 2015.

*Primary Examiner* — Alexander Markoff
(74) *Attorney, Agent, or Firm* — Oblon, McClelland, Maier & Neustadt, L.L.P.

(57) ABSTRACT

A vacuum cleaner capable of recording an abnormality immediately upon occurrence of the abnormality. The vacuum cleaner has a main casing. The vacuum cleaner has driving wheels for enabling the main casing to travel. The vacuum cleaner has a control unit for controlling drive of the driving wheels to make the main casing autonomously travel. The control unit has a function as an abnormality sensor for detecting an abnormality. The vacuum cleaner has a camera for picking up an image. The control unit has a cleaning mode for cleaning a cleaning-object surface, an
(Continued)

image pickup mode for performing image pickup with the camera, and a standby mode applied during a standby state. Upon detection of an abnormality during the cleaning mode, the control unit is switched over to the image pickup mode to perform image pickup with the camera.

16 Claims, 26 Drawing Sheets

(52) U.S. Cl.
CPC ........... *A47L 9/0411* (2013.01); *A47L 9/0477* (2013.01); *A47L 9/28* (2013.01); *A47L 9/2852* (2013.01); *A47L 9/2873* (2013.01); *A47L 9/2884* (2013.01); *A47L 9/2894* (2013.01); *G05D 1/0246* (2013.01); *H04N 7/185* (2013.01); *H04N 7/188* (2013.01); *A47L 2201/022* (2013.01); *A47L 2201/04* (2013.01); *G05D 2201/0215* (2013.01)

(58) Field of Classification Search
CPC .... A47L 9/0477; A47L 9/2852; A47L 9/2873; A47L 9/2884; A47L 9/2894; A47L 2201/022; A47L 2201/04; A47L 9/2805; A47L 9/2889; A47L 2201/00; G05D 1/0246; G05D 2201/0215; G05D 1/021; H04N 7/185; H04N 7/188; B25J 9/0003; B25J 9/1674; B25J 11/0085; B25J 19/02
See application file for complete search history.

(56) References Cited

U.S. PATENT DOCUMENTS

| | | | |
|---|---|---|---|
| 10,022,028 B2 | 7/2018 | Tsuboi et al. | |
| 10,349,794 B2* | 7/2019 | Watanabe | ............... A47L 9/009 |
| 2003/0028993 A1 | 2/2003 | Song et al. | |
| 2005/0015913 A1 | 1/2005 | Kim et al. | |
| 2006/0056677 A1 | 3/2006 | Tani | |
| 2006/0076039 A1* | 4/2006 | Song | ................. G05D 1/0234 134/21 |
| 2006/0132318 A1 | 6/2006 | Shimizu | |
| 2010/0082193 A1* | 4/2010 | Chiappetta | ............... H02J 7/025 701/24 |
| 2011/0264305 A1 | 10/2011 | Choe et al. | |
| 2013/0204463 A1* | 8/2013 | Chiappetta | ............... B60L 53/38 701/2 |
| 2014/0207282 A1* | 7/2014 | Angle | ................. G05B 15/02 700/257 |
| 2014/0379127 A1 | 12/2014 | Tsuboi et al. | |
| 2015/0000068 A1 | 1/2015 | Tsuboi et al. | |
| 2015/0375395 A1* | 12/2015 | Kwon | ................. A47L 9/2857 700/245 |
| 2016/0000289 A1* | 1/2016 | Senoo | ................. A47L 9/2852 15/319 |
| 2016/0202703 A1 | 7/2016 | Matsubara | |
| 2016/0309974 A1* | 10/2016 | Abe | ......................... A47L 9/28 |
| 2017/0079499 A1* | 3/2017 | Schnittman | ............. A47L 11/34 |
| 2017/0231446 A1* | 8/2017 | Watanabe | ................. A47L 9/00 15/319 |
| 2018/0071918 A1* | 3/2018 | Angle | ................. H04L 12/282 |

FOREIGN PATENT DOCUMENTS

| | | |
|---|---|---|
| JP | 2005-296510 A | 10/2005 |
| JP | 2006-134218 A | 5/2006 |
| JP | 2006-155451 A | 6/2006 |
| JP | 2011-233149 A | 11/2011 |
| JP | 2013-146310 A | 8/2013 |
| JP | 2014-6689 A | 1/2014 |
| JP | 2014-142742 A | 8/2014 |
| JP | 2015-52988 A | 3/2015 |
| KR | 10-0756717 B1 | 9/2007 |
| WO | WO 2013/108709 A1 | 7/2013 |

* cited by examiner

VACUUM CLEANER

TECHNICAL FIELD

Embodiments described herein relate generally to a vacuum cleaner including image pickup means such as a camera for example.

BACKGROUND ART

Conventionally, there is known a so-called autonomous-traveling type vacuum cleaner (cleaning robot) which cleans a floor surface as a cleaning-object surface while autonomously traveling on the floor surface and while detecting obstacles or the like by using a sensor or the like as an example.

In recent years, a system has been developed in which such a vacuum cleaner as described above is used to make it possible to monitor and check an aspect of a user's home for occurrence of any abnormality while the user is out, where the vacuum cleaner is enabled to pick up images of in-room aspects with a camera upon an instruction from a mobile terminal such as a mobile phone.

With such a system, however, because the user himself/herself is required to issue an instruction for image pickup, it is impossible to record an abnormality in real time upon occurrence of the abnormality.

CITATION LIST

Patent Literature

PTL 1: Japanese Laid-open Patent Publication No. 2013-146310
PTL 2: Japanese Laid-open Patent Publication No. 2006-155451
PTL 3: Japanese Laid-open Patent Publication No. 2011-233149

SUMMARY OF INVENTION

Technical Problem

An object of the invention is to provide a vacuum cleaner capable of recording an abnormality immediately upon occurrence of the abnormality.

Solution to Problem

A vacuum cleaner in one embodiment of the invention has a main casing. The vacuum cleaner also has driving wheels for enabling the main casing to travel. The vacuum cleaner further has a control unit for controlling drive of the driving wheels to make the main casing autonomously travel. Furthermore, this vacuum cleaner has an abnormality sensor for detecting an abnormality. The vacuum cleaner further has a camera for picking up an image. The control unit has a cleaning mode for cleaning a cleaning-object surface, an image pickup mode for performing image pickup by the camera, and a standby mode applied during a standby state. Upon detection of an abnormality during the cleaning mode by the abnormality sensor, the control unit is switched over to the image pickup mode to pickup an image by the camera.

DESCRIPTION OF EMBODIMENTS

Hereinbelow, a first embodiment will be described in terms of its constitution with reference to FIGS. 1 to 4.

Figure 1:
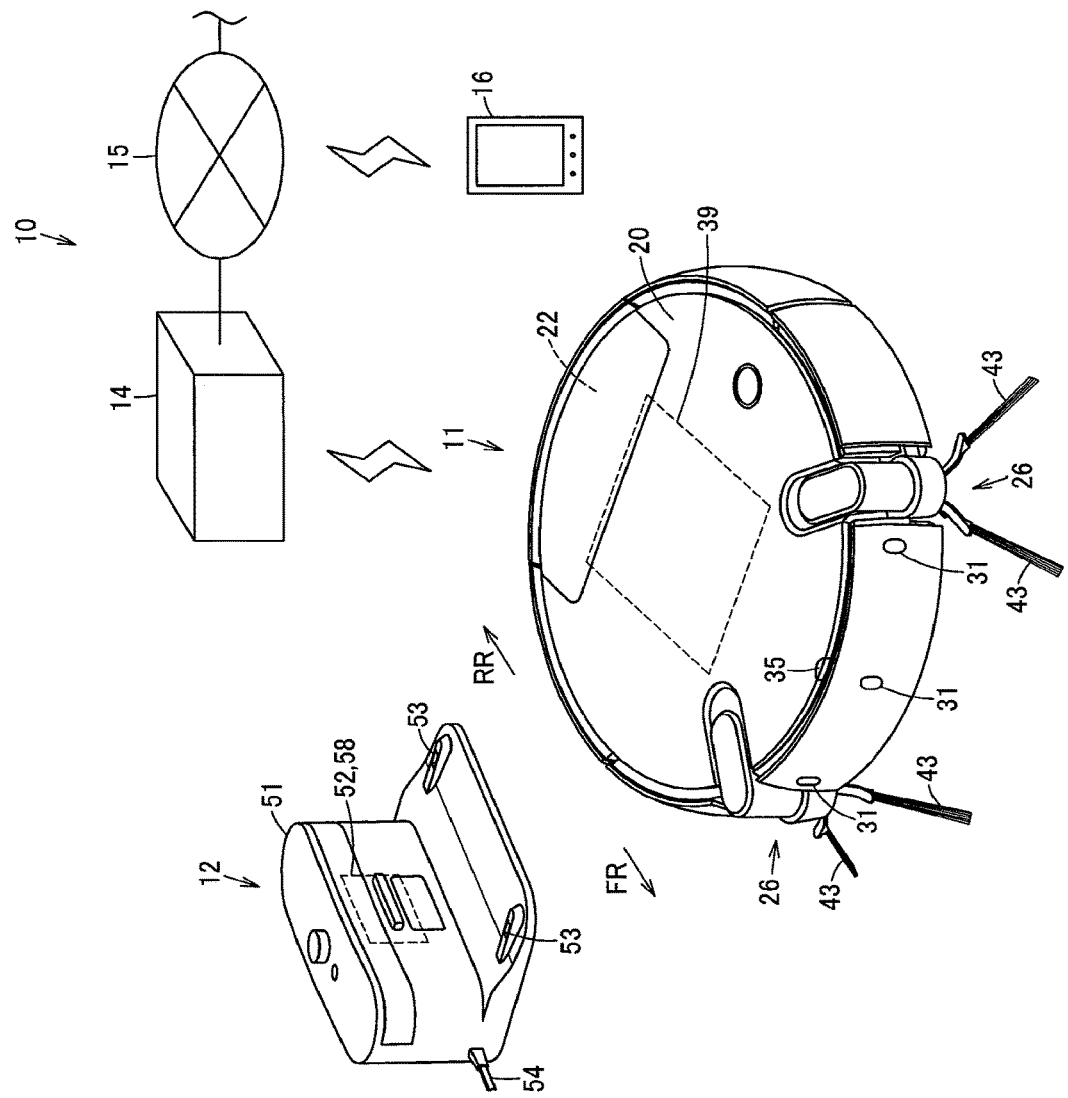
FIG. 1 is an explanatory view schematically showing a system including a vacuum cleaner according to a first embodiment.
Figure 2:
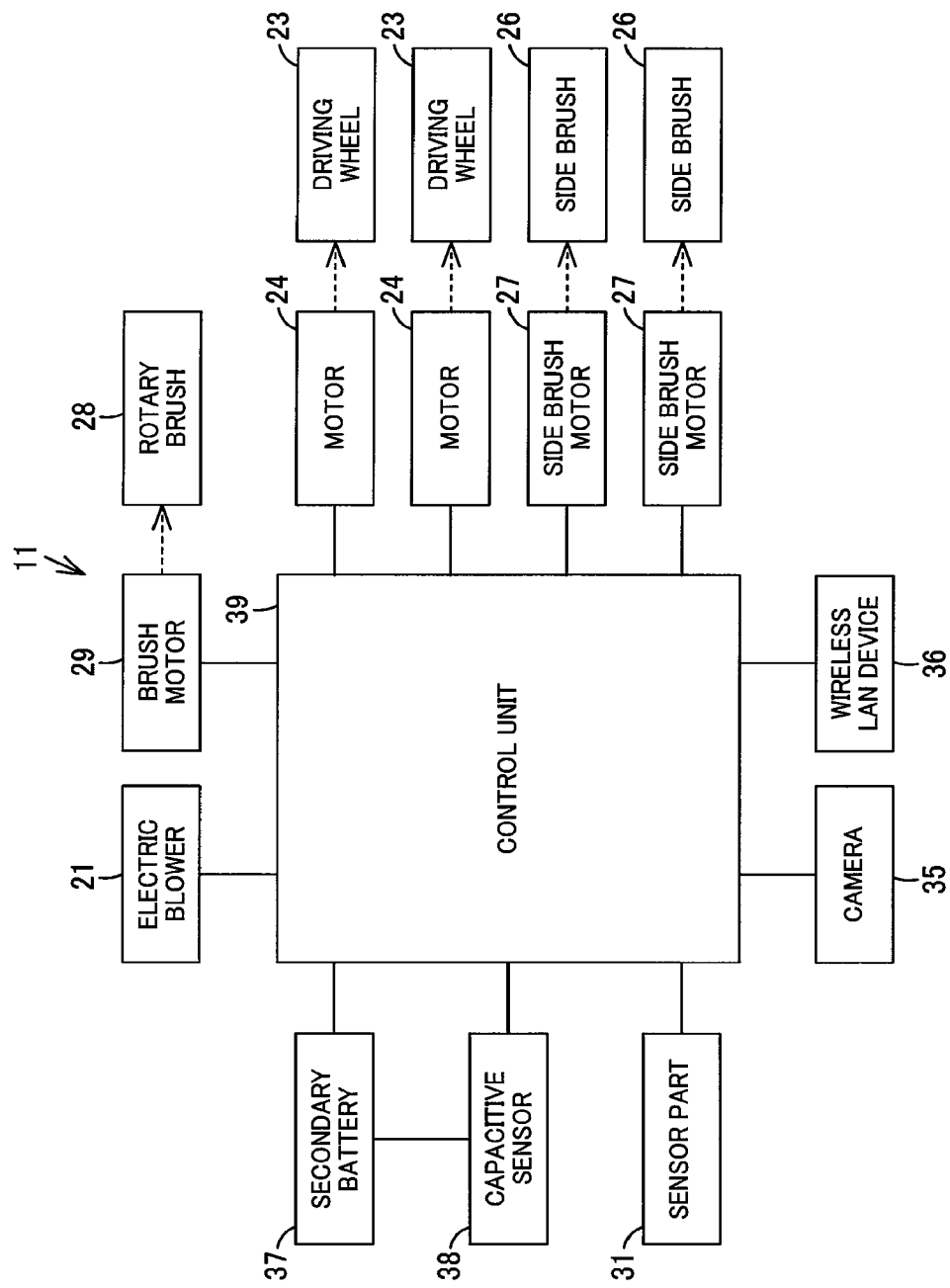
FIG. 2 is an explanatory view schematically showing an internal structure of the vacuum cleaner.
Figure 3:
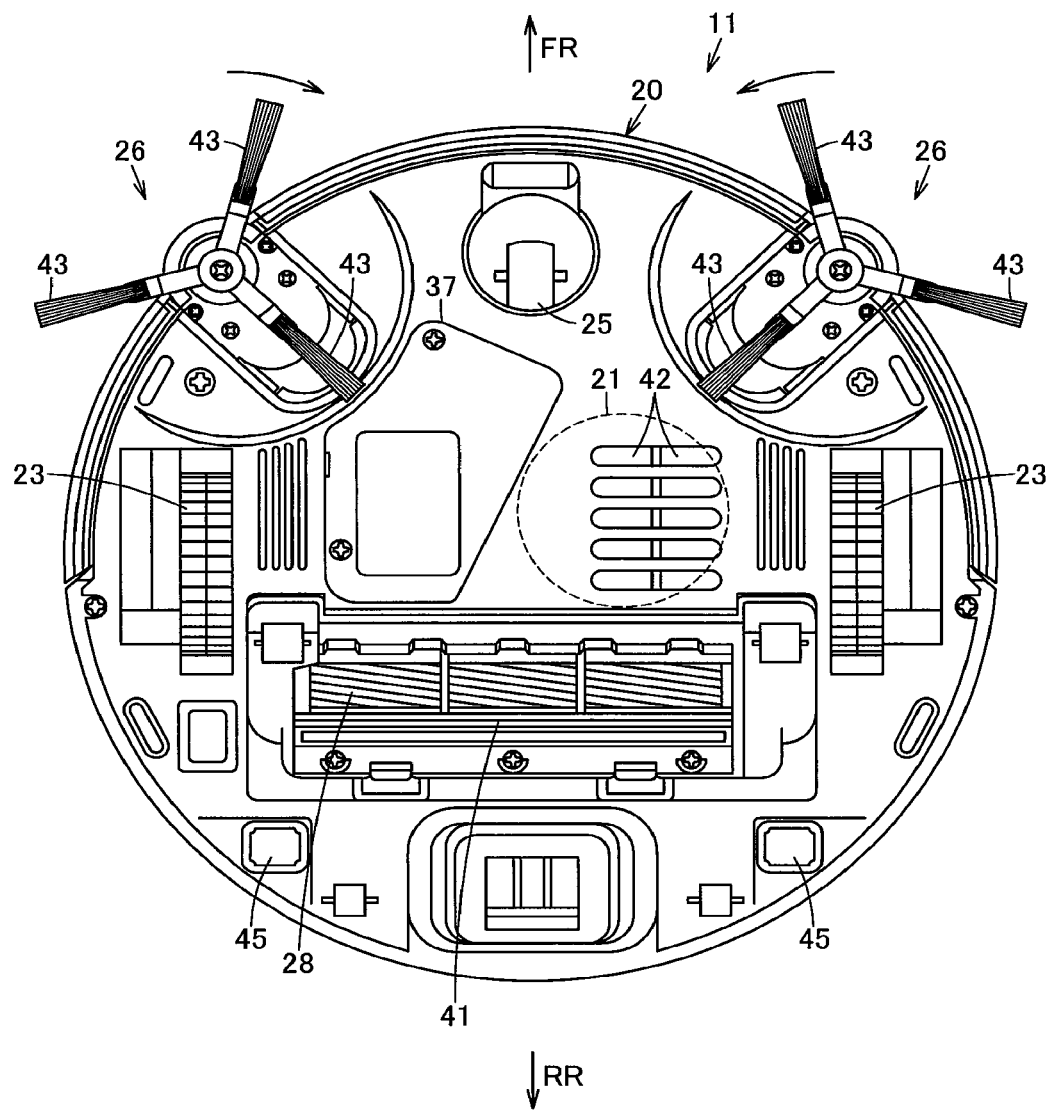
FIG. 3 is a plan view showing the vacuum cleaner as viewed from below.

In FIGS. 1 to 3, reference sign 10 denotes a vacuum cleaning device as a traveling body device. This vacuum cleaning device 10 includes a vacuum cleaner 11 as an autonomous traveling body, and a charging device (charging stand) 12 serving as a base station for charging of the vacuum cleaner 11. The vacuum cleaner 11 is enabled to fulfill wireless communication with an external device 16 such as a mobile phone via a (external) network 15 such as the Internet, for example, by performing communication (transmission and reception) with an access point 14 as relay means (a relay point) such as a home gateway (router) disposed in a room, which is a cleaning region, for example, by using wireless communication such as Wi-Fi (registered trademark) or Bluetooth (registered trademark).

The vacuum cleaner 11, in this embodiment, is a so-called self-propelled robot cleaner which cleans a floor surface as a cleaning-object surface while autonomously traveling (self-propelled to travel) on the floor surface. The vacuum cleaner 11 includes, as its traveling-and-cleaning parts, a hollow main casing 20, an electric blower 21 as an operating part (cleaning part) housed in the main casing 20, a dust collecting unit 22 communicating with a suction side of the electric blower 21, driving wheels 23, 23 as a plurality (pair) of driving parts for traveling use as an example, motors 24, 24 being driving means (drivers) as operating parts for driving the driving wheels 23, 23, a swing wheel 25 for swinging use, side brushes 26, 26 being auxiliary cleaning means (auxiliary cleaning parts), e.g., as a plurality (pair) of swinging-cleaning parts (cleaning parts) disposed in a lower part of the main casing 20 so as to be swingable along a floor surface, side brush motors 27, 27 being swing driving means (swing drivers) as operating parts (cleaning parts) for swinging the side brushes 26, 26, a rotary brush 28 being cleaning means (a cleaning member) as a rotary cleaner (cleaning part) rotatably disposed in a lower part of the main casing 20, a brush motor 29 being rotation driving means (rotation driver) as an operating part (cleaning part) for rotationally driving the rotary brush 28, and the like. The vacuum cleaner 11 also includes, as input/output-and-control parts, sensor parts 31 as operating parts having various types of sensors, a camera 35 as image pickup means (image pickup part), a wireless LAN device 36 being wireless communication means (wireless communication part), a secondary battery 37 being a battery for power supply use, a capacitive sensor 38 as capacity detection means (capacity detection part) for detecting a capacity of the secondary battery 37, a control unit (controller) 39 as control means configured of a circuit board or the like, and the like. In addition, the following description will be given on the assumption that a direction extending along the traveling direction of the vacuum cleaner 11 (main casing 20) is assumed as a back-and-forth direction (directions of arrows FR and RR shown in FIG. 3 etc.) while a left-and-right direction (directions toward both sides) intersecting (orthogonally crossing) the back-and-forth direction is assumed as a widthwise direction.

The main casing 20 is formed into a flat columnar shape (disc shape) or the like from a synthetic resin as an example. A widthwise-longitudinal, i.e., long sideways suction port 41 and a plurality of exhaust ports 42 are opened in a circular-shaped lower surface of the main casing 20. Moreover, the camera 35 is disposed on this main casing 20.

The suction port 41 communicates with the suction side of the electric blower 21 via the dust collecting unit 22. In this suction port 41, the rotary brush 28 is disposed so as to be rotatable.

The electric blower 21, when driven, generates a negative pressure to suck dust and dirt through the suction port 41 to the dust collecting unit 22. The electric blower 21 is housed inside the main casing 20, for example, with its suction side facing rearward and with its axial direction extending along the back-and-forth direction (horizontal direction). In addition, this electric blower 21 may become unnecessary in cases such as when adopting a configuration in which dust and dirt are scraped up to the dust collecting unit 22 by the rotary brush 28 as an example. Therefore, the electric blower 21 is not an essential configuration.

The dust collecting unit 22 is intended to collect dust and dirt sucked through the suction port 41 by the drive of the electric blower 21.

Each of the driving wheels 23 makes the vacuum cleaner 11 (main casing 20) travel (autonomously travel) in the advancing direction and the retreating direction on the floor surface, i.e., is for traveling use. The driving wheels 23, having an unshown rotational axis extending along a left-and-right widthwise direction, are placed symmetrical to each other in the widthwise direction.

Each of the motors 24 is disposed, for example, in correspondence to the driving wheels 23, respectively, and is enabled to drive the driving wheels 23 independently of each other. Each of the motors 24 is connected to each of the driving wheels 23, 23 via unshown gearboxes, respectively. Then, each of the motors 24 constitutes a driving wheel unit integrally with each of the gearboxes and each of the driving wheels 23. The driving wheel unit is biased toward a direction protruding downward of the main casing 20 by a suspension device (hanging device) serving as unshown biasing means (biaser), where gripping force of the driving wheels 23, 23 against the floor surface is ensured by this biasing.

The swing wheel 25, which is positioned at a generally central and front portion of the main casing 20 in the widthwise direction, is a driven wheel swingable along a floor surface.

Each of the side brushes 26 has brush bristles 43 as a plurality (e.g., 3) of cleaner members radially protruding to come into contact with the floor surface. The side brushes 26, 26 are placed at both-side positions forward of the driving wheels 23, 23 and rearward of the swing wheel 25 in the main casing 20.

Each of the side brush motors 27 is enabled to rotate each of the side brushes 26 toward the widthwise center side of the main casing 20, i.e., rotate the right-side side brush 26 toward the left side and rotate the left-side side brush 26 toward the right side so that forward-located (in the advancing direction) dust and dirt are scraped together toward the suction port 41 side by each of the side brushes 26.

In addition, these side brushes 26 and the side brush motors 27 are not essential on the condition that enough cleaning can be fulfilled by the electric blower 21 or the rotary brush 28.

The rotary brush 28 is formed into an elongated shape and its both-end portions are rotatably supported by widthwise both-side portions of the suction port 41. The rotary brush 28 is protruded from the suction port 41 downward of the lower surface of the main casing 20 such that, with the vacuum cleaner 11 laid on the floor surface, the rotary brush 28 has a lower portion in contact with the floor surface so as to scrape off dust and dirt.

The brush motor 29 is housed inside the main casing 20 and is connected to the rotary brush 28 via an unshown gear mechanism as a mechanism part.

In addition, these rotary brush 28 and brush motor are not essential on the condition that enough cleaning can be fulfilled by the electric blower 21 or the side brushes 26, 26.

Further, the sensor parts 31 have, for example, the functions of: rotational speed detection means (rotational speed sensor) such as an optical encoder for measuring a rotational speed of the motor 24; obstacle detection means (obstacle sensor) for detecting an obstacle; step gap detection means (step gap sensor) such as an infrared sensor for detecting a step gap of a floor surface or the like; and the like. These sensor parts 31 are disposed at various portions such as upper portions, outer-peripheral portions (front portion and rear portion), lower portions, and the like of the main casing 20.

The camera 35 includes a camera module as an image-pickup-means main body (image-pickup-part main body) for image pickup use, and an illuminating device such as an LED which is lit by the control unit 39 at the time of image pickup. This camera 35 is disposed, for example, at an outer-peripheral portion or upper portion of the main casing 20 in a front, central part of the main casing 20 in the left-and-right direction. The camera 35 is capable of picking up an image in a direction extending along a radial direction on a center axis of the main casing 20 and a direction inclined upward; in this embodiment, an image over a region ranging from forward to forward-upper portions at a specified horizontal angle of view (e.g., 105° or the like) and moreover, is capable of outputting digitized data of the picked-up images to the control unit 39 by compressing the data into a specified data format. That is, the camera 35 is disposed at a position separate from a swinging center (center axis) of the main casing 20. In addition, images to be picked up with the camera 35 may be either still images or video images. Therefore, it is assumed that hereinafter, unless otherwise specified, images to be picked up with the camera 35 refer to at least either one of still images or video images.

The wireless LAN device 36 is intended to wirelessly communicate with an external device via the access point 14 and the network 15. Therefore, it is possible, via the wireless LAN device 36, to transmit and receive various types of information to and from the network 15. That is, the wireless LAN device 36 has functions as transmission means (transmission part) and reception means (reception part) for transmitting and receiving signals to and from the access point 14 via the network 15.

The secondary battery 37 supplies electric power to the electric blower 21, the motors 24, the side brush motors 27, the brush motor 29, the sensor parts 31, the camera 35, the wireless LAN device 36, the capacitive sensor 38, the control unit 39, and the like. Further, the secondary battery 37 is electrically connected to charging terminals 45 exposed on the lower surface of the main casing 20 as an example.

The capacitive sensor 38 is voltage detection means (voltage sensor) capable of detecting a current capacity of the secondary battery 37 by monitoring the voltage of the secondary battery 37, as an example.

The control unit 39 includes a CPU which is a control means main body (control unit main body), a ROM which is a storage section in which fixed data such as programs to be read out by the CPU have been stored, a RAM which is an area storage section for dynamically forming various memory areas such as a work area serving as a working region for data processing by programs, a memory which is storage means (a storage part) such as an SDRAM for storing therein image data picked up with the camera 35 as an example, a timer for clocking calendar information such as current day and time, and the like. The control unit 39 is electrically connected to the electric blower 21, the motors 24, the side brush motors 27, the brush motor 29, the sensor parts 31, the camera 35, the wireless LAN device 36, the capacitive sensor 38, and the like. The control unit 39 has a function as abnormality detection means (abnormality sensor) for detecting and judging an abnormal state of the vacuum cleaner 11 (main casing 20) based on a residual capacity, i.e. remaining quantity, of the secondary battery 37 detected by the capacitive sensor 38. Further, the control unit 39 has a cleaning mode which is a traveling mode for, while executing autonomous travel, cleaning the floor surface by controlling the drive of the electric blower 21, the motors 24, the side brush motors 27, the brush motor 29 and the like based on detection results of the sensor parts 31; a charging mode for charging the secondary battery 37 via the charging device 12; an image pickup mode for performing image pickup with the camera 35; and a standby mode applied during a standby state.

Meanwhile, the charging device 12 is disposed at a position non-obstructive of cleaning such as a vicinity of a wall portion that defines a room. In this charging device 12, a charging circuit 52 such as a constant current circuit for use of charging the secondary battery is housed in a charging device casing 51, and terminals for charging 53, 53 electrically connected to the charging circuit 52 as well as a power cord 54 for power supply use connected to a commercial power source and the like are exposed outside the charging device casing 51. Operation of the charging circuit 52 is controlled by a charging device control unit (charging device controller) 58 as charging device control means. Further, the charging device control unit 58 has a charging mode for charging the secondary battery 37 via the charging circuit 52, and a standby mode applied during a standby state.

Figure 4:
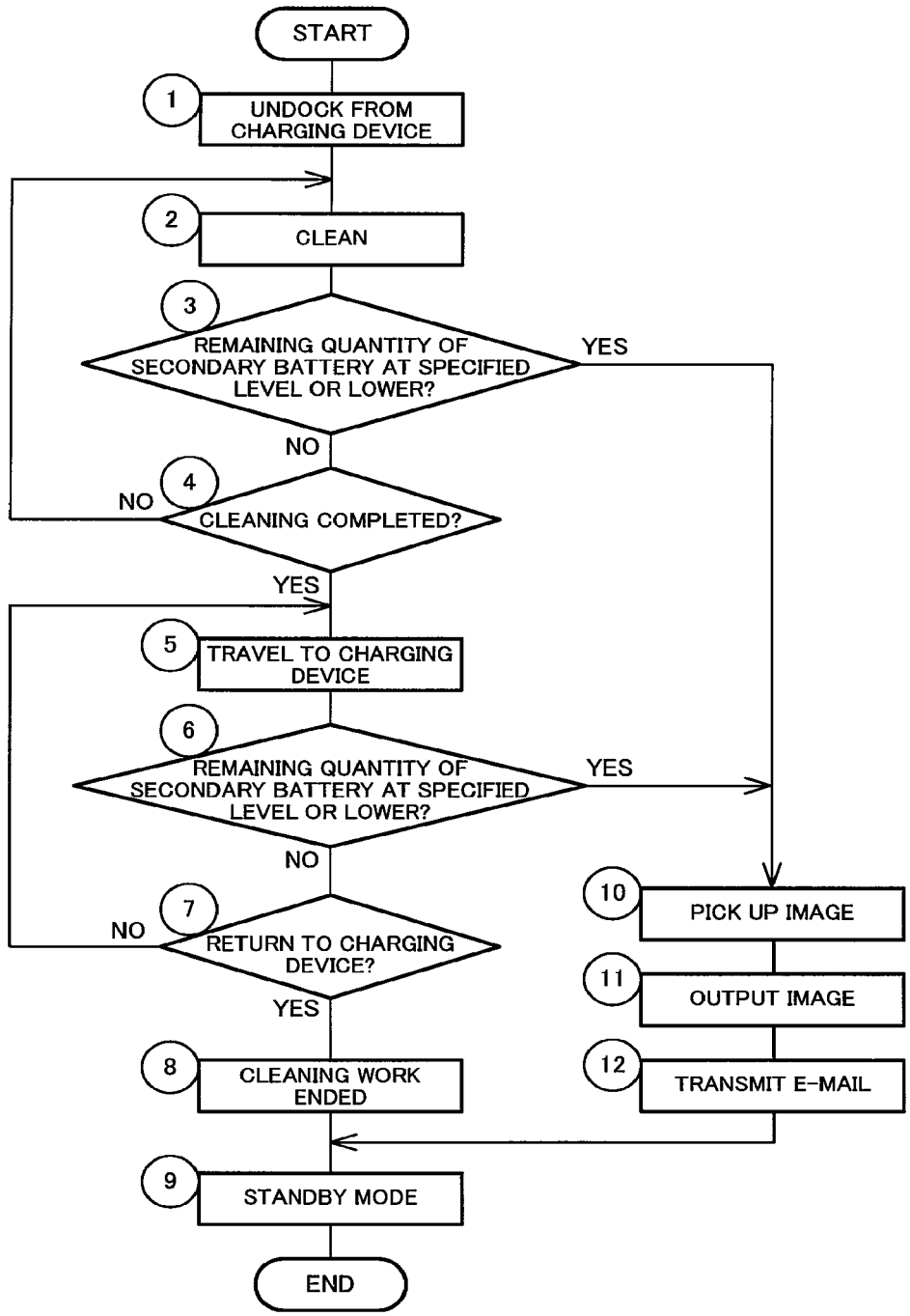
FIG. 4 is a flowchart showing control in an image pickup mode of the vacuum cleaner.

Next, operations of the above-described first embodiment will be described also with reference to the flowchart shown in FIG. 4.

As an outline, after the start of cleaning, the vacuum cleaner 11 returns to the charging device 12 after the end of the cleaning unless the capacity of the secondary battery 37 comes to a specified level or lower before the end of the cleaning. When the capacity of the secondary battery 37 has come to the specified level or lower during cleaning, or when the capacity of the secondary battery 37 has come to the specified level or lower during return to the charging device 12, the vacuum cleaner 11 picks up an image with the camera 35. After this image pickup with the camera 35, the vacuum cleaner transmits an e-mail (electronic mail), moving to a standby state (stopped state). It should be noted that the transmission of an e-mail is not essential.

More specifically, in the vacuum cleaner 11, for example, at a cleaning-start timing such as an arrival at a preset cleaning start time, the control unit 39 is switched over from standby mode to cleaning mode to drive the electric blower 21, the driving wheels 23, 23 (motors 24, 24), the side brushes 26, 26 (side brush motors 27, 27), the rotary brush 28 (brush motor 29) and the like, so that the vacuum cleaner 11 is undocked (departed) from the charging device 12 as an example (step 1) to clean while autonomously traveling on the floor surface by means of the driving wheels 23, 23 (step 2). In addition, the start position for cleaning may be set to any arbitrary place such as a traveling start position of the vacuum cleaner 11 or an entrance of the room or the like.

In this step 2, the control unit 39 monitors a traveling state of the vacuum cleaner 11 (main casing 20) by detecting, for example, distances to a wall portion surrounding the room, an obstacle within the room or the like as well as a step gap of the floor surface or the like via the sensor parts 31. In response to detection by the sensor parts 31, the control unit 39 drives the driving wheels 23, 23 (motors 24, 24) so that the vacuum cleaner 11 travels randomly or along a wall portion, for example, on the floor surface while avoiding any obstacles, step gaps and the like. Then, the vacuum cleaner 11 scrapes together dust and dirt to the suction port 41 by the side brushes 26, 26 that are driven to swing. The dust and dirt on the floor surface are sucked in along with air by the suction port 41 on which a negative pressure generated by the drive of the electric blower 21 has acted via the dust collecting unit 22. Also, the rotary brush 28 that is driven to rotate scrapes off dust and dirt on the floor surface to the dust collecting unit 22. The dust and dirt sucked along with air through the suction port 41 are isolated and collected into the dust collecting unit 22. Air from which the dust and dirt have been isolated is sucked into the electric blower 21, cooling the electric blower 21 and thereafter becoming exhaust air which is discharged outside the main casing 20 through the exhaust ports 42.

During this cleaning operation, the control unit 39 monitors the residual capacity, i.e. remaining quantity, of the secondary battery 37 via the capacitive sensor 38 with an aim of preventing insufficiency of the capacity of the secondary battery 37. Then, the control unit 39 decides whether or not the current capacity of the secondary battery 37 (remaining quantity of the secondary battery 37) has come to a preset specified level or lower (e.g., 5% or lower of rated capacity) (step 3) where, if it is decided that the capacity of the secondary battery has not come to the specified level or lower, the control unit 39 decides whether or not the cleaning of the cleaning region has been completed (step 4). If it is decided at this step 4 that the cleaning has not yet been completed, the process returns to step 2. If it is decided at this step 4 that the cleaning has been completed, the vacuum cleaner 11 makes the control unit 39 drive the driving wheels 23, 23 (motors 24, 24) so as to travel to the charging device 12 (step 5). For this traveling, the vacuum cleaner 11 may be made to approach the charging device 12 based on a guide signal outputted from the charging device 12 as an example or may return to the position of the charging device 12 according to a room map previously stored in the control unit 39.

Next, the control unit 39 decides whether or not the current capacity of the secondary battery 37 (remaining quantity of the secondary battery 37) has come to a preset specified level or lower (e.g., 5% or lower of rated capacity) (step 6). If it is decided that the capacity of the secondary battery 37 has not come to the specified level or lower, the control unit 39 decides whether or not the vacuum cleaner 11 has returned (gone home) to the charging device 12 (step 7). If it is decided at step 7 that the vacuum cleaner 11 has not returned to the charging device 12, the process returns to step 5. If it is decided at this step 7 that the vacuum cleaner 11 has returned to the charging device 12, the charging terminals 45 are (mechanically and electrically) connected to the terminals for charging 53, where the individual parts are stopped so that cleaning work is ended (step 8), moving to the standby mode (sleep mode) (step 9).

In the case where the vacuum cleaner 11 has returned to the charging device 12 as described above, at a specified timing, e.g. when a preset charging start time has come or when a specified time has elapsed since docking of the vacuum cleaner 11 with the charging device 12, the control unit 39 and the charging device control unit 58 each shift to the charging mode, driving the charging circuit 52 so that the charging of the secondary battery 37 is started. Then, when the capacity (voltage) of the secondary battery 37 has increased to a specified level (specified voltage), the control unit 39 and the charging device control unit 58 stop the charging by the charging circuit 52 to end the charging work, where the control unit 39 and the charging device control unit 58 each shift to the standby mode.

On the other hand, in the case where it is decided at step 6 that the capacity of the secondary battery 37 has come to the specified level or lower, the control unit 39 decides that the charging device 12 to be returned to could not be found, or the vacuum cleaner 11 (main casing 20) has gotten into a travel-disabled state (abnormal state) due to being stuck such as catching on a step gap, for example, where the control unit 39 is switched over to the image pickup mode. At the position of this occurrence, the control unit 39 stops the electric blower 21, the motors 24, 24, the side brush motors 27, 27, the brush motor 29, and the like and picks up an image with the camera 35 (step 10), then temporarily stores the picked-up image, for example, into the memory in a specified compressed image format and outputs the image data to the access point 14 via the wireless LAN device 36 (step 11). This image data is transmitted from the access point 14 to a particular server connected to the network 15 and stored (uploaded) onto this server so as to be viewable by using a specified application or the like. Further, when the image is uploaded to the server, the server transmits an e-mail to an external device 16 (step 12), the process moving to step 9. This e-mail, for example, has a URL for the image on the server described therein so that a user, who has received the e-mail via the external device 16, can access the URL described in the e-mail to view the image that the vacuum cleaner 11 has picked up.

Similarly, also at step 3, if it is decided that the capacity of the secondary battery 37 has come to the specified level or lower, the control unit 39 decides that the vacuum cleaner 11 (main casing 20) has gotten into a travel-disabled state (abnormal state) during the cleaning and proceeds to step 10.

The image pickup with the camera 35 at step 10 in this embodiment is done as a one-shot image pickup because the image pickup is carried out basically in a state in which the vacuum cleaner 11 (main casing 20) has become unable to move any more due to an insufficient capacity of the secondary battery 37.

Thus, during the cleaning mode or after the cleaning mode, when the control unit 39 has detected that the remaining quantity of the secondary battery 37 is at a specified level or lower, the mode is switched over to the image pickup mode so that an image is picked up with the camera 35. Moreover, after this image pickup, the mode is switched over to the standby mode, so that even if the vacuum cleaner 11 is unable to return to the charging device 12 due to an insufficient capacity of the secondary battery 37, i.e. battery exhaustion, the picked-up image allows the user to easily determine the position of the vacuum cleaner 11, facilitating and ensuring finding the vacuum cleaner 11.

Figure 5:
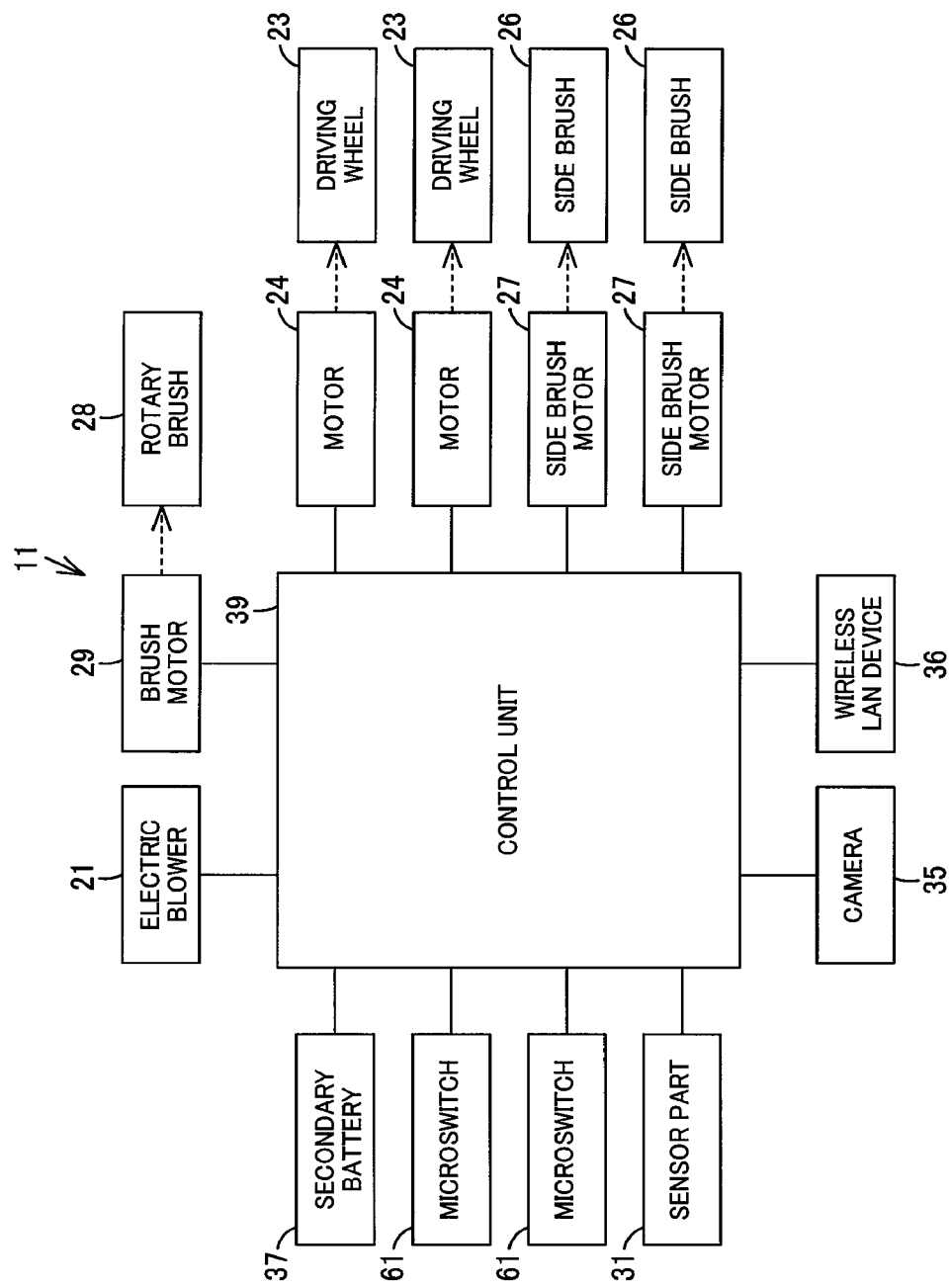
FIG. 5 is an explanatory view schematically showing an internal structure of a vacuum cleaner according to a second embodiment.
Figure 6:
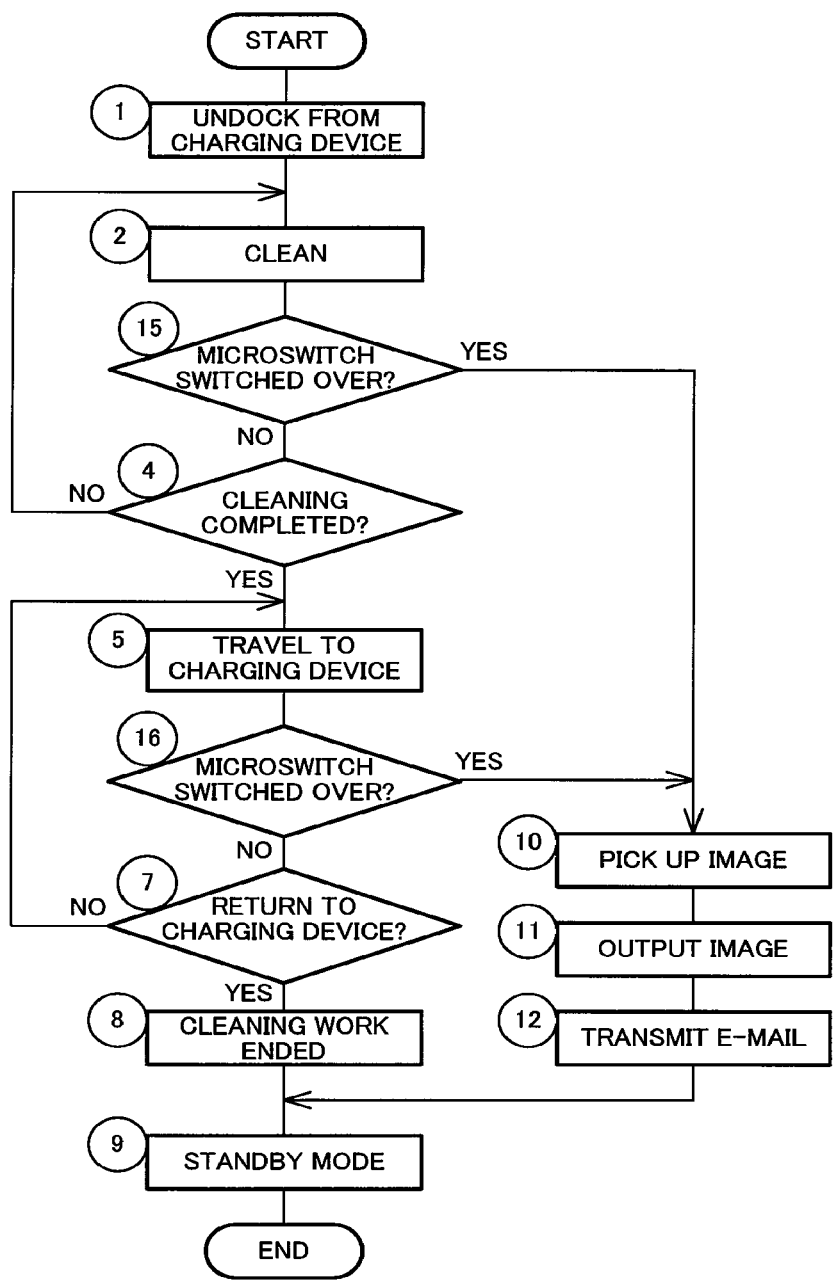
FIG. 6 is a flowchart showing control in an image pickup mode of the vacuum cleaner.

Next, a second embodiment will be described with reference to FIGS. 5 and 6. It is noted that the same components and functions as in the above-described first embodiment are designated by the same reference signs and their description is omitted.

This second embodiment includes, instead of the capacitive sensor 38 of the above-described first embodiment, microswitches 61, 61 as driving-wheel protrusion detection means (driving wheel sensor) for detecting that the driving wheels 23, 23 have protruded to a specified extent or more.

Each of the microswitches 61, which is disposed, for example, above each of the driving wheel units within the main casing 20, is electrically connected to the control unit 39. As to each of the driving wheel units (each of the driving wheels 23), when each driving wheel 23 has protruded to a specified extent or more downward from the main casing 20

(lower surface of the main casing 20), the driving wheel 23 comes into contact with the driving wheel unit so that the microswitch 61 is switched over between on and off states. As a result of this, the control unit 39 is enabled to detect that each driving wheel 23 has protruded to a specified extent or more downward from the main casing 20 (lower surface of the main casing 20), i.e., that each driving wheel 23 has floated (come off) from the floor surface, which is the traveling surface.

Then, in this embodiment, as an outline, unless the driving wheels 23 are floated from the floor surface as the traveling surface after a start of cleaning and before an end of the cleaning, the vacuum cleaner 11 returns to the charging device 12 after the end of the cleaning. Also, when the driving wheels 23 have floated from the floor surface as the traveling surface during cleaning, or when the driving wheels 23 have floated from the floor surface as the traveling surface during the return to the charging device 12, the vacuum cleaner 11 performs image pickup with the camera 35. After this image pickup with the camera 35, the vacuum cleaner 11 transmits an e-mail, going to the standby state (stopped state). In addition, the transmission of the e-mail is not essential.

More specifically, in this embodiment, the following step 15 and step 16 are executed instead of step 3 and step 6 of the above-described first embodiment.

That is, at step 15 and step 16, the control unit decides whether or not at least one of the microswitches 61 has been switched over between on and off states. Then, if it is decided that the microswitch 61 has been switched over between on/off, it is judged, for example, that the main casing 20 has become aground on a step gap so that either of the driving wheels 23 idly turns, causing the vacuum cleaner 11 (main casing 20) to be in a travel-disabled state (abnormal state). As a result, the control unit 39 is switched over to the image pickup mode, proceeding to step 10.

As described above, when the control unit 39 has detected during the cleaning mode or after the cleaning mode that at least one of the driving wheels 23, 23 has floated from the floor surface (traveling surface), the control unit 39 is switched over to the image pickup mode to perform image pickup with the camera 35. Moreover, after this image pickup, the control unit 39 is switched over to the standby mode, so that even if the vacuum cleaner 11 becomes unable to travel and is unable to return to the charging device 12 due to going-aground on a step gap or the like, the picked-up image allows the user to easily determine the position of the vacuum cleaner 11, facilitating and ensuring finding the vacuum cleaner 11.

Figure 7:
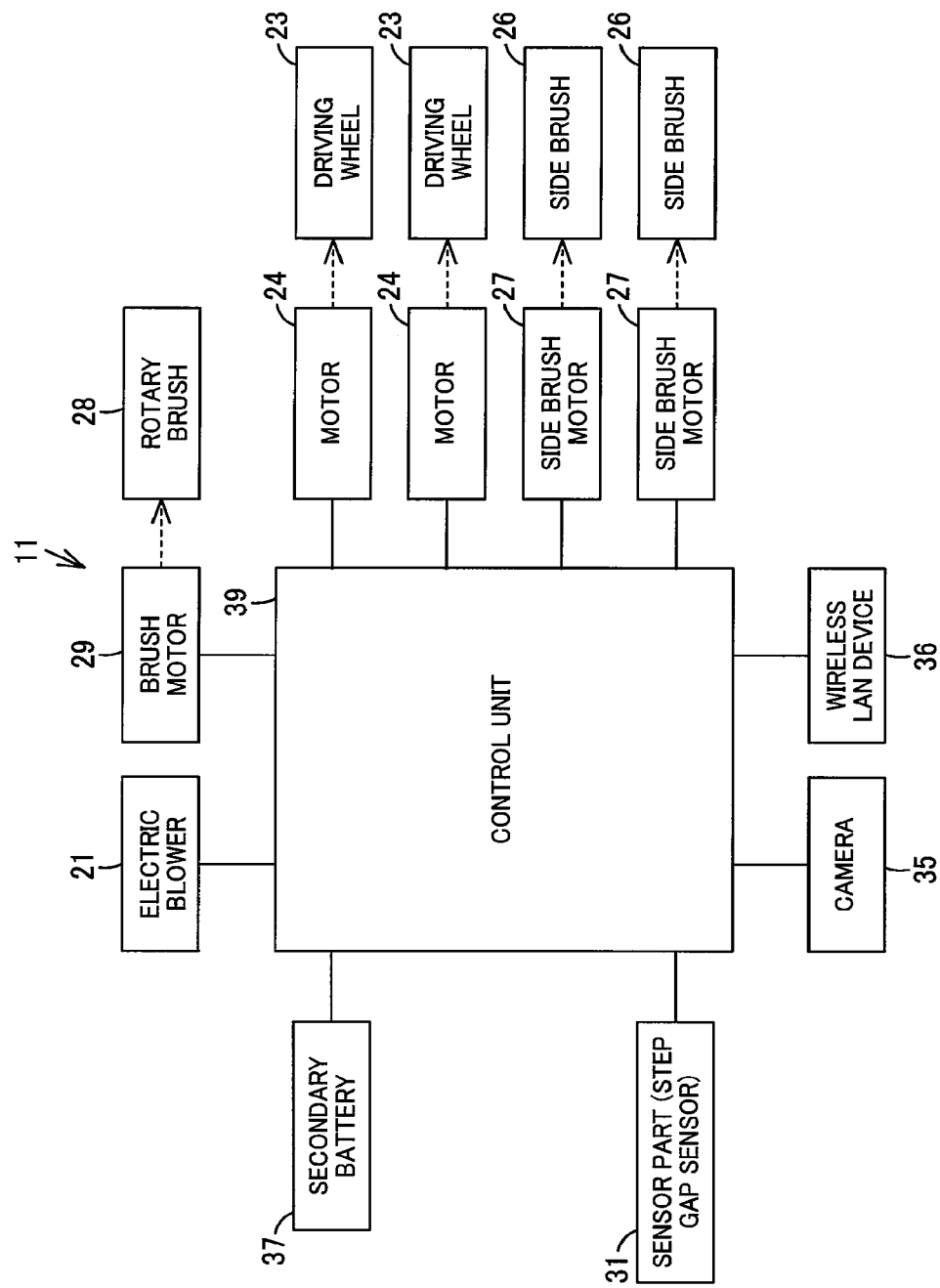
FIG. 7 is an explanatory view schematically showing an internal structure of a vacuum cleaner according to a third embodiment.
Figure 8:
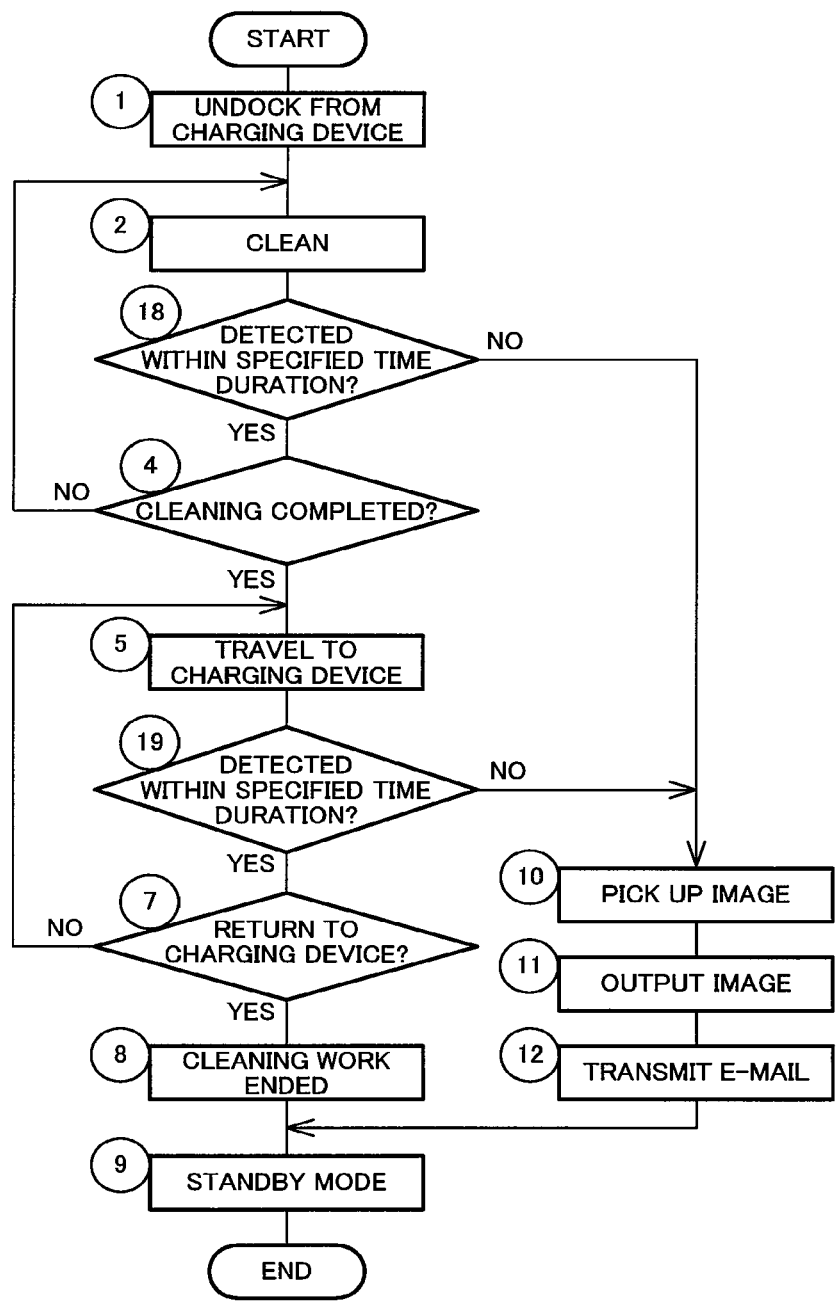
FIG. 8 is a flowchart showing control in an image pickup mode of the vacuum cleaner.

Next, a third embodiment will be described with reference to FIGS. 7 and 8. It is noted that the same components and functions as in each of the above-described embodiments are designated by the same reference signs and their description is omitted.

This third embodiment includes, instead of the capacitive sensor 38 of the above-described first embodiment, a step gap sensor of the sensor parts 31 which provides a function of deciding whether or not the main casing 20 has been overturned.

That is, the step gap sensor is a distance measuring sensor for detecting whether or not the floor surface is positioned within a downward specified distance from the lower surface of the main casing 20 by measuring a distance between the lower surface of the main casing 20 and a position facing the lower surface. If this distance is a specified distance or more, the control unit 39 decides that there is a step gap such as a down stair, for example. Therefore, if nothing within a specified distance from a position facing the lower surface of the main casing 20 is detected for a specified time duration or more, it can be decided that the main casing 20 has been overturned.

Then, in this embodiment, as an outline, unless the main casing 20 is overturned after a start of cleaning and before an end of cleaning, the vacuum cleaner 11 returns to the charging device 12 after the end of the cleaning. Also, when the main casing 20 has overturned during cleaning, or when the main casing 20 has overturned during the return to the charging device 12, the vacuum cleaner 11 performs image pickup with the camera 35. After this image pickup with the camera 35, the vacuum cleaner 11 transmits an e-mail, going to the standby state (stopped state). In addition, the transmission of the e-mail is not essential.

More specifically, in this embodiment, the following step 18 and step 19 are executed instead of step 3 and step 6 of the above-described first embodiment.

That is, at step 18 and step 19, the control unit decides whether or not nothing facing the lower surface of the main casing 20 has been detected within a specified distance for a specified time duration or more by the function of the step gap sensor of the sensor parts 31. Then, if it is decided that nothing facing the lower surface of the main casing 20 has been detected within a specified distance for a specified time duration or more, it is judged, for example, that the main casing 20 has been tilted over or overturned due to a fall from down stairs or the like so that the vacuum cleaner 11 (main casing 20) has gone into a travel-disabled state (abnormal state). As a result, the control unit 39 is switched over to the image pickup mode, proceeding to step 10.

As described above, when the control unit 39 has detected during the cleaning mode or after the cleaning mode that the main casing 20 has overturned, the control unit 39 is switched over to the image pickup mode to perform image pickup with the camera 35. Moreover, after this image pickup, the control unit 39 is switched over to the standby mode, so that even if the vacuum cleaner is in a travel-disabled state so as to be unable to return to the charging device 12 due to a fall or tilting, the picked-up image allows the user to easily determine the position of the vacuum cleaner 11, facilitating and ensuring finding the vacuum cleaner 11.

Still, since the vacuum cleaner 11 is normally equipped with the function of a step gap sensor for detecting a step gap to allow autonomous traveling, the function of this step gap sensor can be utilized effectively as it is, making it unnecessary to provide any additional component.

Figure 9:
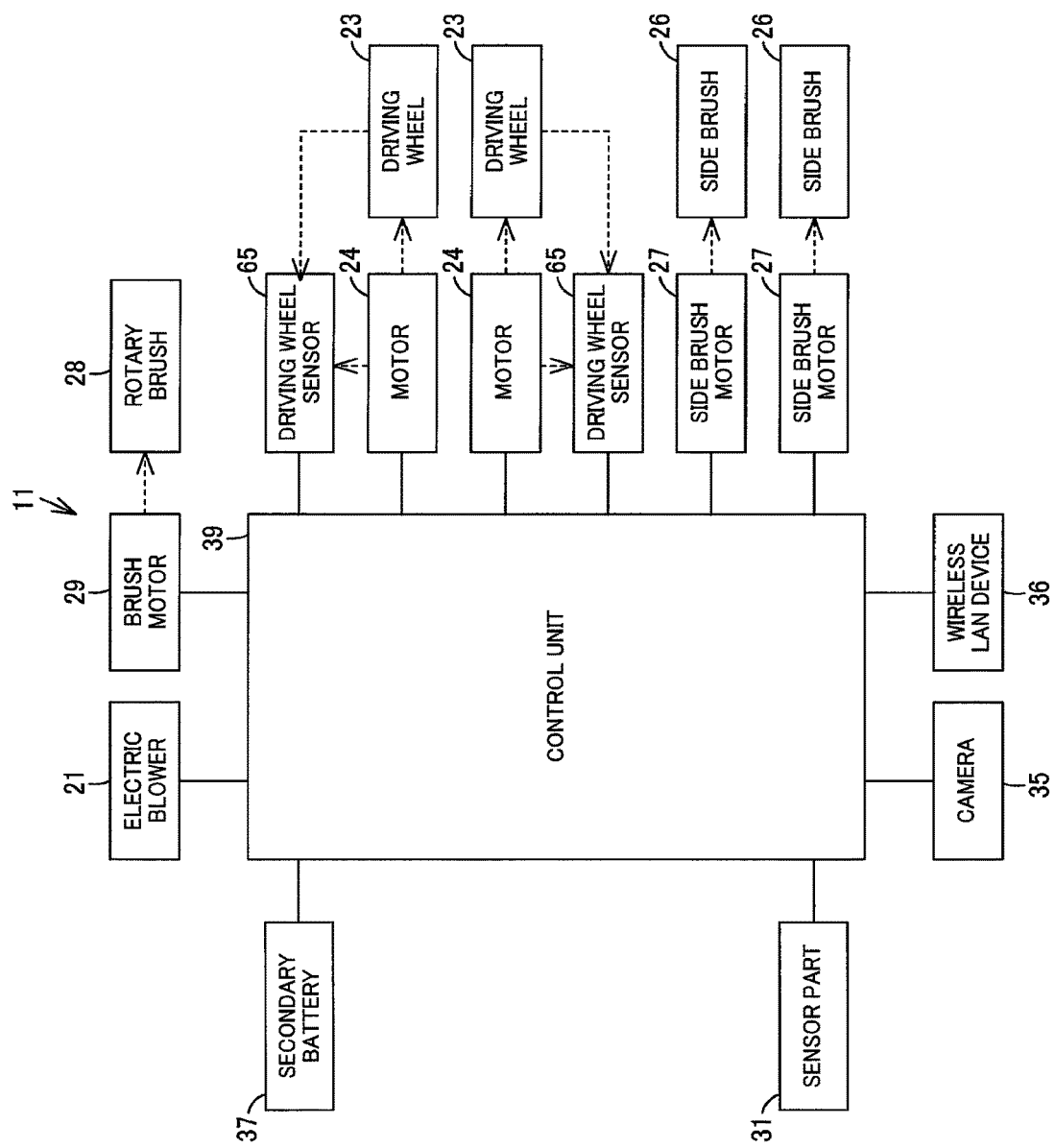
FIG. 9 is an explanatory view schematically showing an internal structure of a vacuum cleaner according to a fourth embodiment.
Figure 10:
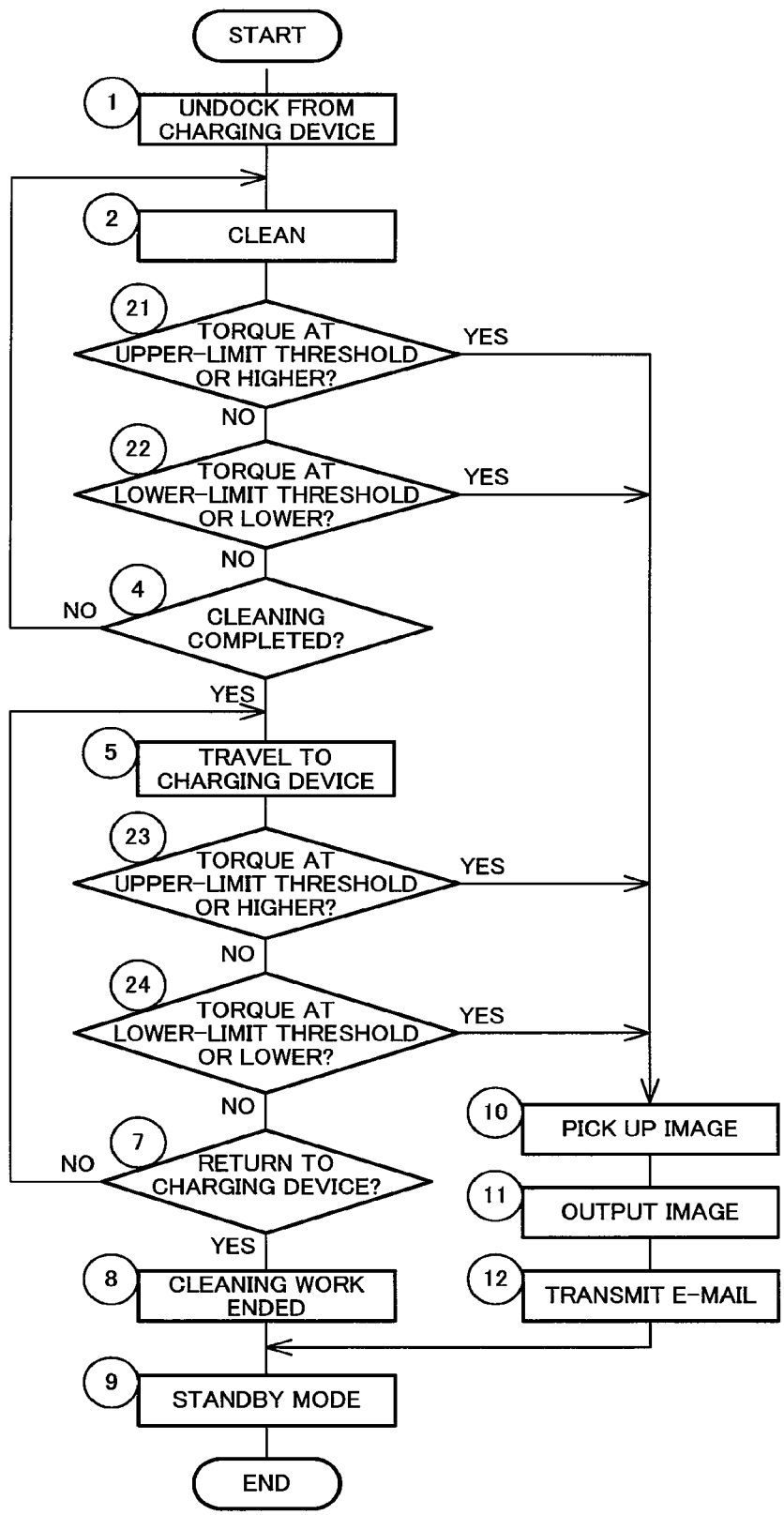
FIG. 10 is a flowchart showing control in an image pickup mode of the vacuum cleaner.

Next, a fourth embodiment will be described with reference to FIGS. 9 and 10. It is noted that the same components and functions as in each of the above-described embodiments are designated by the same reference signs and their description is omitted.

This fourth embodiment includes, instead of the capacitive sensor 38 of the above-described first embodiment, driving wheel sensors 65, 65 as driving-wheel detection means for detecting a stuck state or idle turning of the driving wheels 23, 23.

Each of the driving wheel sensors 65 is, for example, a torque sensor for detecting torque of the driving wheels 23, 23 or the motors 24, 24. When a torque detected by the driving wheel sensors 65 has come to a specified upper-limit threshold or more, it can be determined by the control unit 39 that the driving wheel (motor 24) has become stuck. On the other hand, when the torque has come to a specified lower-limit threshold or less, it can be determined by the control unit 39 that the driving wheel 23 (motor 24) is idly turning.

Then, in this embodiment, as an outline, unless the driving wheel 23 (motor 24) gets stuck or idly turns after a start of cleaning and before an end of cleaning, the vacuum cleaner 11 returns to the charging device 12 after the end of the cleaning. Also, when the driving wheel 23 (motor 24) has become stuck or idly turns during the cleaning or when the driving wheel 23 (motor 24) has become stuck or idly turns during the return to the charging device 12, the vacuum cleaner 11 performs image pickup with the camera 35. After this image pickup with the camera 35, the vacuum cleaner 11 transmits an e-mail, going to the standby state (stopped state). In addition, the transmission of the e-mail is not essential.

More specifically, in this embodiment, the following steps 21 to 24 are executed instead of step 3 and step 6 of the above-described first embodiment.

That is, at step 21 and step 23, the control unit decides by each of the driving wheel sensors 65 whether or not the torque of at least any one of the driving wheels 23, 23 (motors 24, 24) has come to a specified upper-limit threshold or more. Then, if it is decided that the torque of at least any one of the driving wheels 23, 23 (motors 24, 24) has come to a specified upper-limit threshold or more, it is judged that at least any one of the driving wheels 23, 23 has become stuck due to entangling of carpet piles on the floor surface or the like so that the vacuum cleaner 11 (main casing 20) has gone into a travel-disabled state (abnormal state). As a result, the control unit 39 is switched over to the image pickup mode, proceeding to step 10.

On the other hand, at step 21 and step 23, if it is decided by each of the driving wheel sensors 65 that the torque of at least any one of the driving wheels 23, 23 (motors 24, 24) has not come to a specified upper-limit threshold or more, the control unit 39 proceeds to step 22 and step 24, where the control unit 39 decides by each of the driving wheel sensors 65 whether or not the torque of at least any one of the driving wheels 23, 23 (motors 24, 24) has come to a specified lower-limit threshold or less. Then, if it is decided by each of the driving wheel sensors 65 that the torque of at least any one of the driving wheels 23, 23 (motors 24, 24) has come to a specified lower-limit threshold or less, it is judged that at least any one of the driving wheels 23, 23 has slipped and is idly turning due to the state of the floor surface so that the vacuum cleaner 11 (main casing 20) has gone into a travel-disabled state (abnormal state). As a result, the control unit 39 is switched over to the image pickup mode, proceeding to step 10.

As described above, when the control unit 39 has detected during the cleaning mode or after the cleaning mode that at least any one of the driving wheels 23, 23 has become stuck or is idle, the control unit 39 is switched over to the image pickup mode to perform image pickup with the camera 35. Moreover, after this image pickup, the control unit 39 is switched over to the standby mode, so that even if the vacuum cleaner 11 is in a travel-disabled state so as to be unable to return to the charging device 12 due to catching or slipping on the floor surface, the picked-up image allows the user to easily determine the position of the vacuum cleaner 11, facilitating and ensuring finding the vacuum cleaner 11.

In addition, the driving wheel sensors 65 of the above-described fourth embodiment may be replaced, for example, with current detection means (current sensors) or the like for detecting a stuck state or idle turning of the driving wheels 23 (motors 24) by detecting a current flowing through the motor 24.

Figure 11:
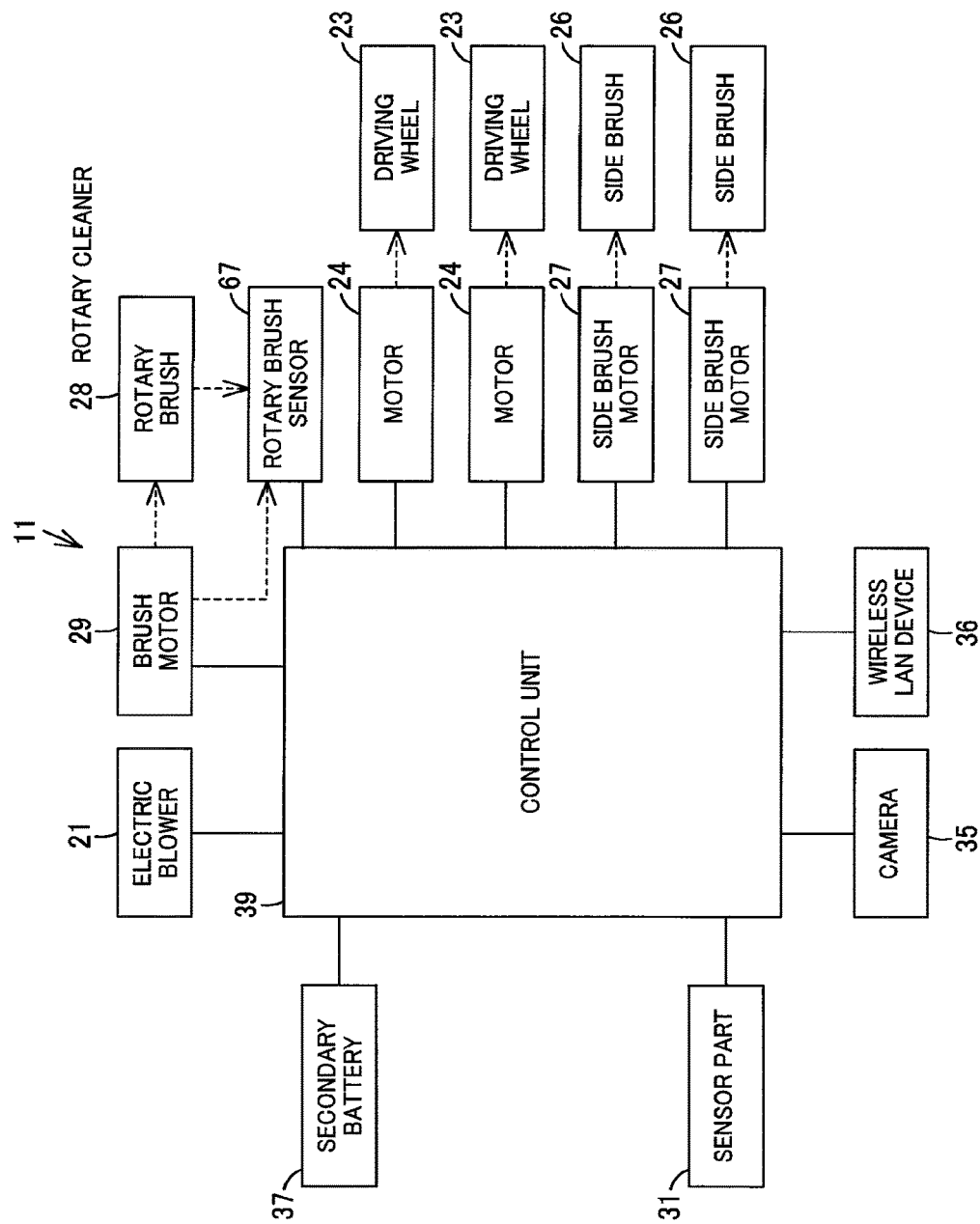
FIG. 11 is an explanatory view schematically showing an internal structure of a vacuum cleaner according to a fifth embodiment.
Figure 12:
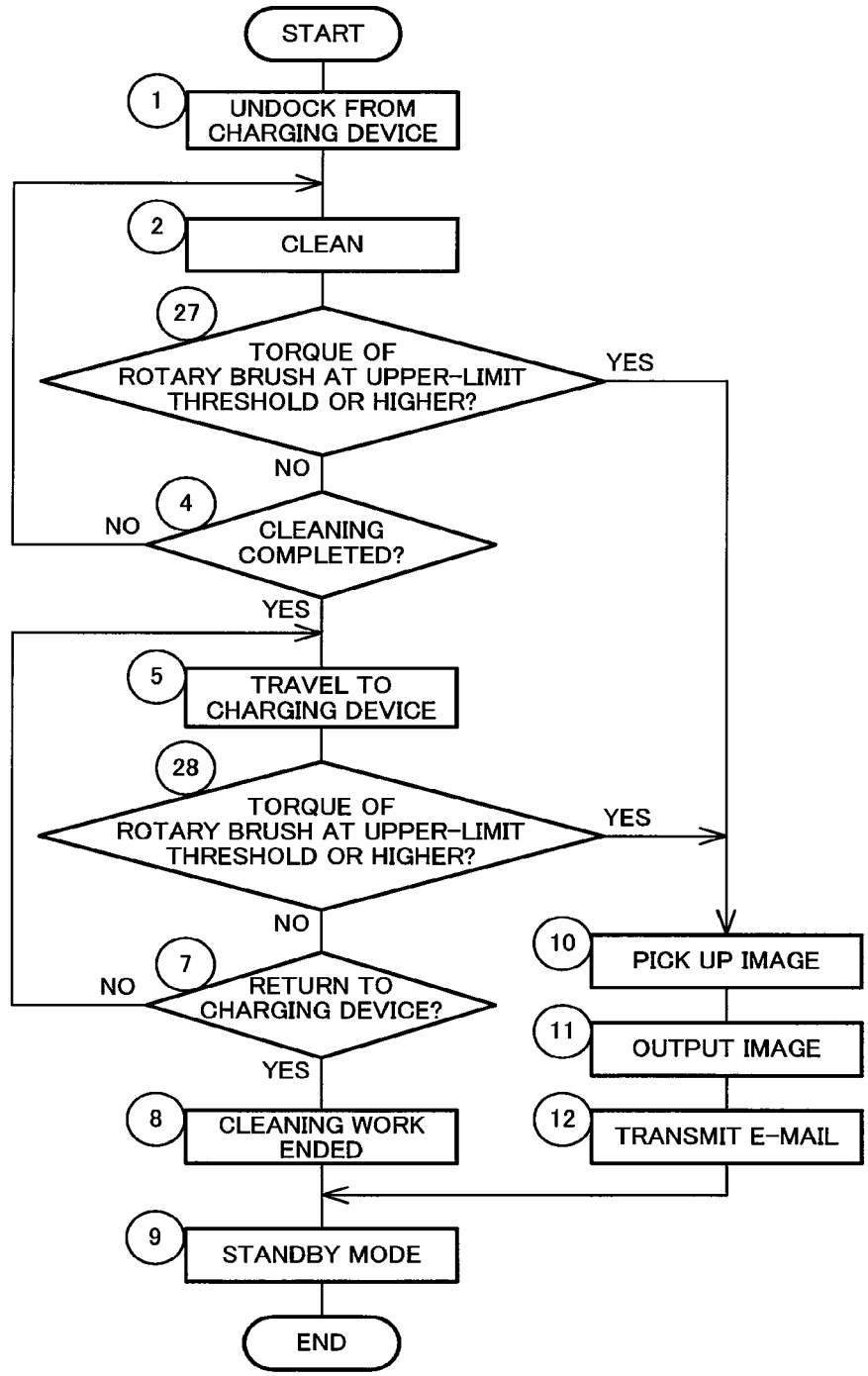
FIG. 12 is a flowchart showing control in an image pickup mode of the vacuum cleaner.

Next, a fifth embodiment will be described with reference to FIGS. 11 and 12. It is noted that the same components and functions as in each of the above-described embodiments are designated by the same reference signs and their description is omitted.

This fifth embodiment includes, instead of the capacitive sensor 38 of the above-described first embodiment, a rotary brush sensor 67 as rotary-cleaner drive detection means (a rotary-cleaner drive detection part) for detecting locking of the rotary brush 28.

The rotary brush sensor 67 is, for example, a torque sensor for detecting torque of the rotary brush 28 or the brush motor 29. When a torque detected by the rotary brush sensor 67 has come to a specified upper-limit threshold (e.g., 1 N·m) or more, it can be determined that the rotary brush 28 (brush motor 29) has locked.

Then, in this embodiment, as an outline, unless the rotary brush 28 has locked after a start of cleaning and before an end of cleaning, the vacuum cleaner 11 returns to the charging device 12 after the end of the cleaning. Also, when the rotary brush 28 has locked during cleaning or when the rotary brush 28 has locked during the return to the charging device 12, the vacuum cleaner 11 performs image pickup with the camera 35. After this image pickup with the camera 35, the vacuum cleaner 11 transmits an e-mail, going to the standby state (stopped state). In addition, the transmission of the e-mail is not essential.

More specifically, in this embodiment, the following step 27 and step 28 are executed instead of step 3 and step 6 of the above-described first embodiment.

That is, at step 27 and step 28, the control unit 39 decides, by the rotary brush sensor 67, whether or not the torque of the rotary brush 28 (brush motor 29) has come to a specified upper-limit threshold or more. Then, if it is decided that the torque of the rotary brush 28 (brush motor 29) has come to a specified upper-limit threshold or more, it is judged that the rotary brush 28 has locked due to suction of some foreign matter to the suction port 41 or entangling of carpet piles of the floor surface with the rotary brush 28 or the like so that the vacuum cleaner 11 (main casing 20) goes into a movement-disabled state and cleaning-disabled state (abnormal state). As a result, the control unit 39 is switched over to the image pickup mode, proceeding to step 10.

As described above, when the control unit 39 has detected during the cleaning mode or after the cleaning mode that the rotary brush 28 has locked, the control unit 39 is switched over to the image pickup mode to perform image pickup with the camera 35. Moreover, after this image pickup, the control unit 39 is switched over to the standby mode, so that even if the vacuum cleaner 11 is unable to travel and return to the charging device 12 due the rotary brush 28 being caught on the floor surface, the picked-up image allows the user to easily determine the position of the vacuum cleaner 11, facilitating and ensuring finding the vacuum cleaner 11.

Figure 13:
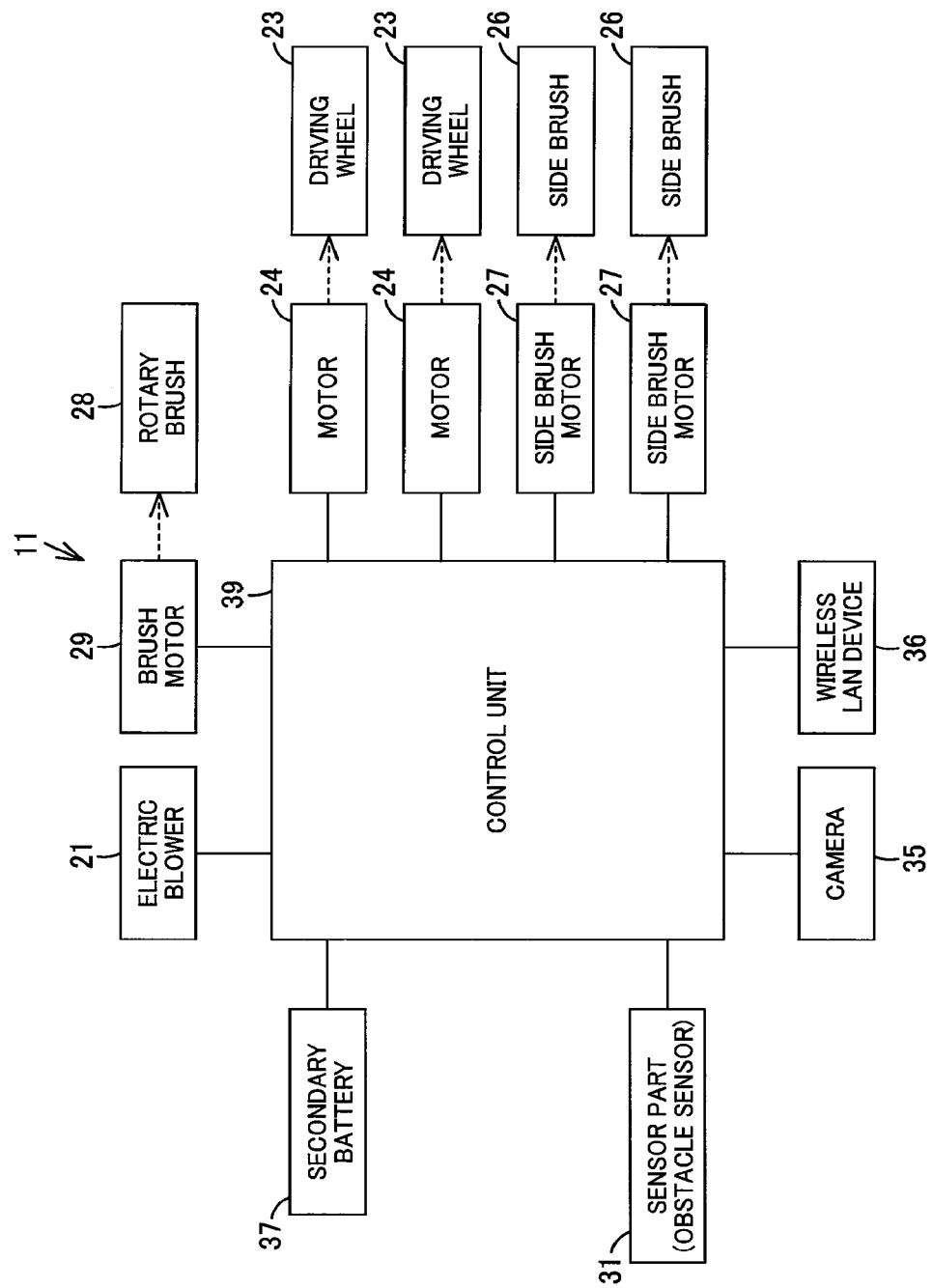
FIG. 13 is an explanatory view schematically showing an internal structure of a vacuum cleaner according to a sixth embodiment.
Figure 14:
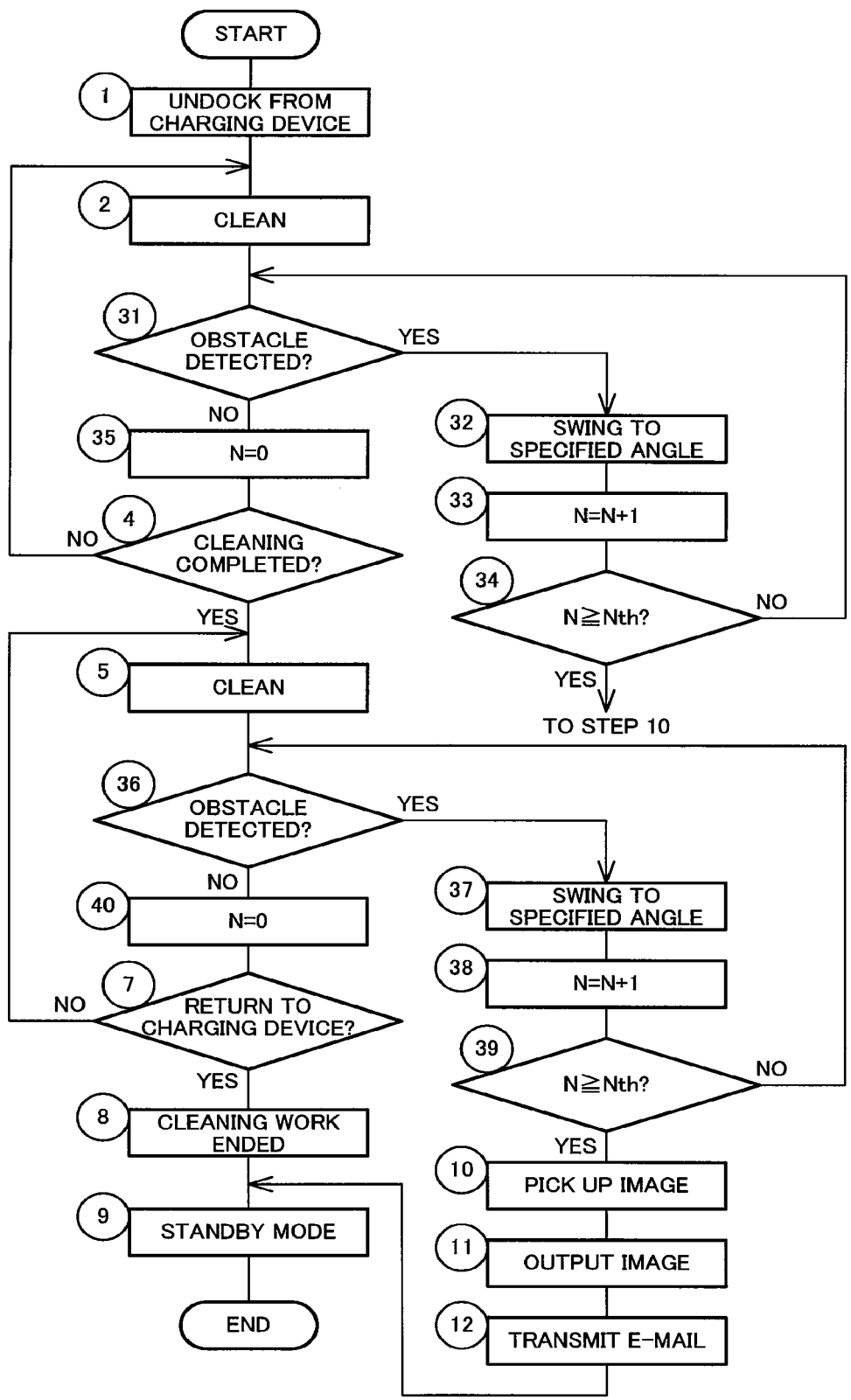
FIG. 14 is a flowchart showing control in an image pickup mode of the vacuum cleaner.

Next, a sixth embodiment will be described with reference to FIGS. 13 and 14. It is noted that the same components and functions as in each of the above-described embodiments are designated by the same reference signs and their description is omitted.

This sixth embodiment includes, instead of the capacitive sensor 38 of the above-described first embodiment, an obstacle sensor of the sensor parts 31 which provides a function of detecting whether or not an obstacle has been detected to a specified number of times or more within a specified time duration.

As the obstacle sensor, noncontact-type distance measuring means (a distance measuring sensor) such as an ultrasonic sensor or contact-type contact detection means (a contact sensor) for detecting an obstacle by making contact with the obstacle may be used.

Then, in this embodiment, as an outline, unless an obstacle is detected to a specified number of times or more within a specified time duration (unless the vacuum cleaner 11 has entered a position where the main casing 20 is circumferentially surrounded by an obstacle) after a start of cleaning and before an end of cleaning, the vacuum cleaner 11 returns to the charging device 12 after the end of the cleaning. Also, when an obstacle is detected to a specified number of times or more within a specified time duration (when the vacuum cleaner 11 has entered a position where the main casing 20 is circumferentially surrounded by an obstacle) during cleaning or when an obstacle is detected to a specified number of times or more within a specified time duration (when the vacuum cleaner 11 has entered a position where the main casing 20 is circumferentially surrounded by an obstacle) during the return to the charging device 12, the vacuum cleaner 11 performs image pickup with the camera 35. After this image pickup with the camera 35, the vacuum cleaner 11 transmits an e-mail, going to the standby state (stopped state). In addition, the transmission of the e-mail is not essential.

More specifically, in this embodiment, the following steps 31 to 40 are executed instead of step 3 and step 6 of the above-described first embodiment.

That is, at step 31 and step 36, if it is decided by the function of the obstacle sensor of the sensor parts 31 that an obstacle has been detected forward of the main casing 20, the control unit 39 drives one driving wheel 23 (motor 24) in an advancing direction and the other driving wheel 23 (motor 24) in a retreat direction while the control unit 39 makes the main casing 20 swing (spin turn) to a specified angle, e.g. 60°, in its then current position (step 32 and step 37), where the number N of obstacle consecutive-detection times is incremented by 1 (N=N+1, step 33 and step 38) by using a built-in counter or the like. Then, the control unit 39 decides whether or not the number N of obstacle consecutive-detection times has come to a specified value Nth, e.g. 6 or more (step 34 and step 39). If it is decided that the number N of obstacle consecutive-detection times has not come to the specified value Nth or more (N≥Nth), the control unit 39 returns to step 31 and step 36. If it is decided that the number N of obstacle consecutive-detection times has come to the specified value Nth or more (N≥Nth), then it is judged that the vacuum cleaner 11 (main casing 20) has entered and cannot escape from a place such as a dead end where the vacuum cleaner 11 (main casing 20) is circumferentially surrounded by an obstacle so that the vacuum cleaner 11 (main casing 20) is in a travel-disabled state and cleaning-disabled state. As a result, the control unit 39 is switched over to the image pickup mode, proceeding to step 10.

In addition, at step 31 and step 36, if it is decided that no obstacles have been detected, the number N of obstacle consecutive-detection times is reset to 0 (N=0, step 35 and step 40).

As described above, when the control unit 39 has detected during the cleaning mode or after the cleaning mode that an obstacle has been detected to a specified number of times or more within a specified time duration, the control unit 39 is switched over to the image pickup mode to perform image pickup with the camera 35. Moreover, after this image pickup, the control unit 39 is switched over to the standby mode, so that even if the vacuum cleaner 11 is surrounded by an obstacle so as to be immovable and unable to return to the charging device 12, the picked-up image allows the user to easily determine the position of the vacuum cleaner 11, facilitating and ensuring finding the vacuum cleaner 11.

In addition, since the vacuum cleaner 11 is normally equipped with the function of an obstacle sensor for detecting an obstacle to allow autonomous traveling, the function of this obstacle sensor can be utilized effectively as it is, making it unnecessary to provide any additional component.

In at least one of the above-described embodiments, when an abnormal state of the vacuum cleaner 11, i.e. a travel-disabled state or cleaning-disabled state of the main casing 20, is detected, the control unit 39 is switched over to the image pickup mode to perform image pickup with the camera 35. Moreover, after this image pickup, the control unit 39 is switched over to the standby mode. The vacuum cleaner 11, which autonomously travels and autonomously cleans, has difficulty self-recovering from a travel-disabled state or a cleaning-disabled state. Therefore, picking up an image at the position at which an abnormality has occurred as described above allows the user to easily recover the vacuum cleaner 11 in an abnormal state and moreover urges the user to improve the cleaning environment so as to prevent later recurrence of an abnormal state at the same position during autonomous travel or autonomous cleaning.

Figure 15:
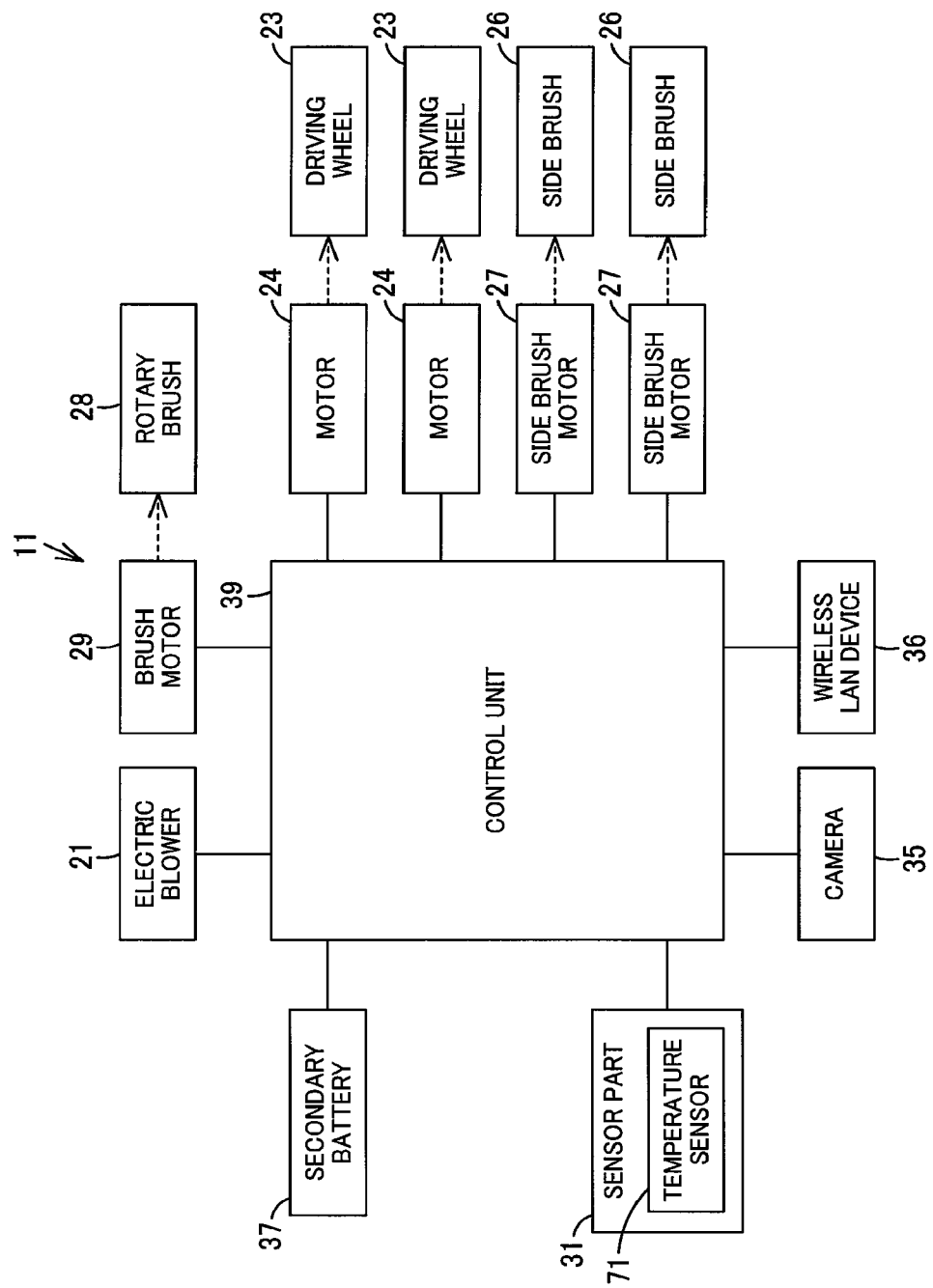
FIG. 15 is an explanatory view schematically showing an internal structure of a vacuum cleaner according to a seventh embodiment.
Figure 16:
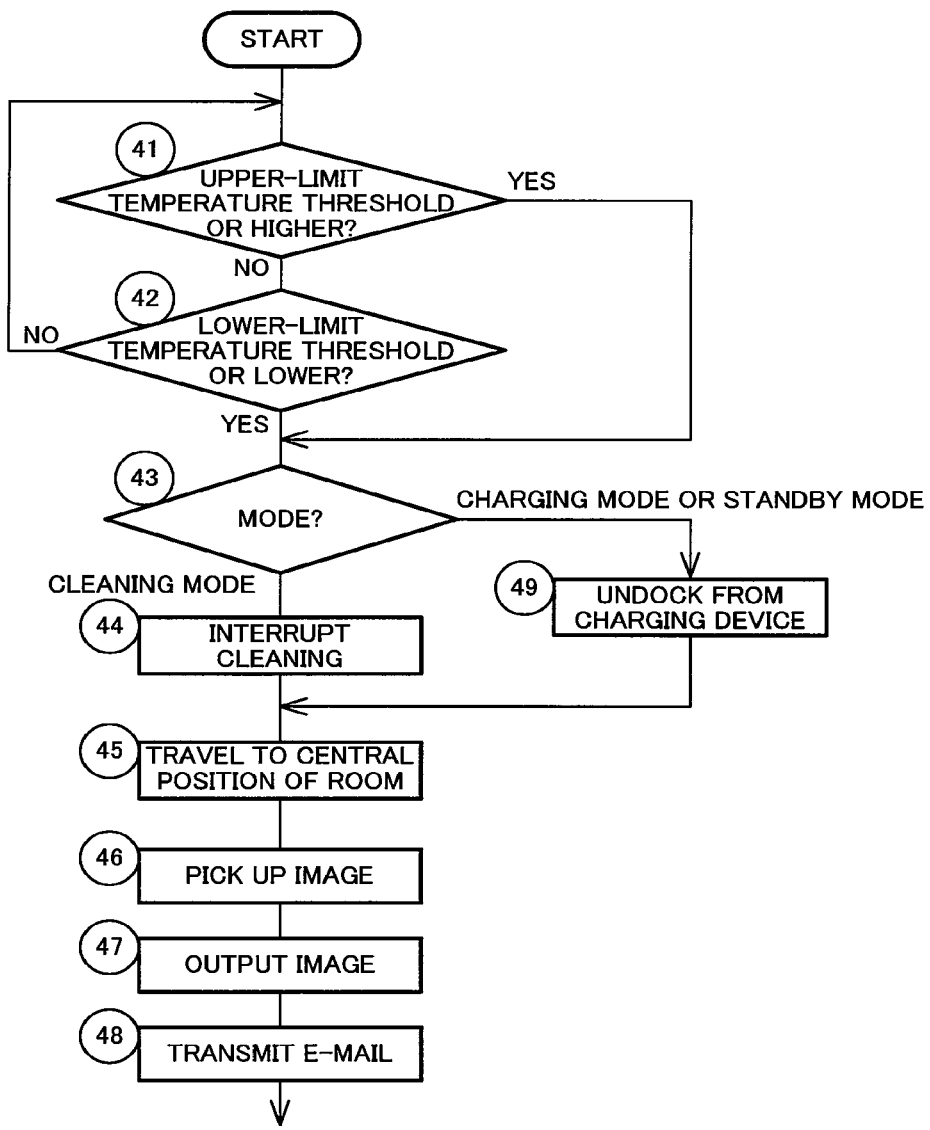
FIG. 16 is a flowchart showing control in an image pickup mode of the vacuum cleaner.

Next, a seventh embodiment will be described with reference to FIGS. 15 and 16. It is noted that the same components and functions as in each of the above-described embodiments are designated by the same reference signs and their description is omitted.

This seventh embodiment includes, instead of the capacitive sensor 38 of the above-described first embodiment, a temperature sensor 71, included in the sensor parts 31, for detecting a temperature (room temperature) around the main casing 20 (vacuum cleaner 11).

Further, the control unit 39 decides that an abnormality has occurred when the temperature detected by the temperature sensor 71 has come to a specified upper-limit temperature threshold, e.g. 40° C. or higher, or has come to a specified lower-limit temperature threshold, e.g. 0° C. or lower. For example, when the temperature (room temperature) is a specified upper-limit temperature threshold or higher, such an abnormal state as a fire occurring in the room can be assumed. When the temperature (room temperature) is a specified lower-limit temperature threshold or lower, such an abnormal state can be assumed in which the in-room temperature has lowered to around an outside air temperature due to the user's going out and leaving the window open in winter, or the intrusion of an intruder through a window or the like. In addition, since temperature varies depending on the region or the season, it is preferable that the user is allowed to set these temperature thresholds as required.

Then, in this embodiment, when the control unit 39 has detected, by the temperature sensor 71, an abnormal high temperature that is the specified upper-limit temperature threshold or higher, or an abnormal low temperature that is the specified lower-limit temperature threshold or lower during the cleaning mode, the vacuum cleaner 11 interrupts the cleaning, travels to a preset specified position, and performs image pickup with the camera 35. Also, when the control unit 39 has detected, by the temperature sensor 71, an abnormal high temperature that is the specified upper-limit temperature threshold or higher, or an abnormal low temperature that is the specified lower-limit temperature threshold or lower during the charging mode or during the standby mode, the vacuum cleaner 11 is undocked from the charging device 12, travels to a preset specified position, and performs image pickup with the camera 35.

More specifically, in this embodiment, the control unit 39 first decides whether or not a temperature detected by the temperature sensor 71 is a specified upper-limit temperature threshold or higher (step 41). If it is decided that the temperature is not the specified upper-limit temperature threshold or higher, it is decided whether or not the temperature detected by the temperature sensor 71 is a specified lower-limit temperature threshold or lower (step 42). Then, if it is decided at this step 42 that the temperature is not the specified lower-limit temperature threshold or lower, the control unit 39 returns to step 41. Meanwhile, if it is decided at step 41 that the temperature detected by the temperature sensor 71 is the specified upper-limit temperature threshold or higher, or if it is decided at step 42 that the temperature detected by the temperature sensor 71 is the specified lower-limit temperature threshold or lower, then the control unit 39 decides whether it is in the cleaning mode or in the charging mode or in the standby mode (step 43). If it is decided at this step 43 that it is in the cleaning mode, then the control unit 39 is switched over to the image pickup mode, where the motors 24, 24, the side brush motors 27, 27, the brush motor 29, and the like are stopped to interrupt the cleaning (step 44). Then, the control unit 39 drives the driving wheels 23, 23 (motors 24, 24) so that the vacuum cleaner 11 travels to a specified image pickup position such as a central position of the room (step 45), where an image is picked up with the camera 35 (step 46) as in the steps 10 to 12 of the above-described first embodiment. The picked-up image, after being subjected to data compression as required, is outputted to the access point 14 via the wireless LAN device 36 (step 47), and an e-mail is transmitted from the server to the external device 16 (step 48).

Also, if it is decided at step 43 that it is in the charging mode or in the standby mode, the control unit 39 is switched over to the image pickup mode where the control unit 39 drives the driving wheels 23, 23 (motors 24, 24) so that the vacuum cleaner 11 is undocked from the charging device 12 (step 49), the process proceeding to step 45.

Then, after step 48, the control unit 39 may return to the mode immediately before switching over to the image pickup mode, or may be stopped as it is to shift to the standby mode, or may return to the charging device 12 to shift to the charging mode or the standby mode.

In addition, the control for moving the main casing to the central position of the room may be such control that, for example, while the main casing 20 is swung, a distance between the main casing 20 and an obstacle such as a wall portion around the main casing 20 is measured by the function of the obstacle sensor (distance measuring sensor) of the sensor parts 31, and the main casing 20 is moved gradually to positions where the measured distance is kept at a constant distance (e.g., 2 m) or more, or the main casing 20 is moved toward a specified position preset for the vacuum cleaner (control unit 39).

Also, when an image is picked up with the camera 35, for example, for pickup of a still image, while the main casing 20 is being swung in a fixed direction in increments of a specified angle, which is the horizontal angle of view of the camera 35 or less as an example, still images in neighboring plural directions are picked up sequentially. On the other hand, for pickup of a video image with the camera 35, while the image is being picked up with the camera 35, the main casing 20 is swung in a fixed direction in increments of a specified angle, which is the horizontal angle of view of the camera 35 or less as an example. As a result, images can be picked up without dead angles on the whole.

As described above, when the control unit 39 has detected during the cleaning mode that the in-room temperature has come to a specified upper-limit temperature threshold or higher or to a specified lower-limit temperature threshold or lower, the control unit 39 is switched over to the image pickup mode to perform image pickup with the camera 35, followed by uploading the picked-up image to the server. As a result of this, the user is enabled to visually check aspects within the room easily by the picked-up images, such as whether a sneak thief or other intruder is present, whether a heater or other fire source is left on, or whether a fire has occurred. Thus, the picked-up images are not only usable for in-home crime prevention, but can also be used for easily and securely checking pets' and children's safety during the user's absence.

Figure 17:
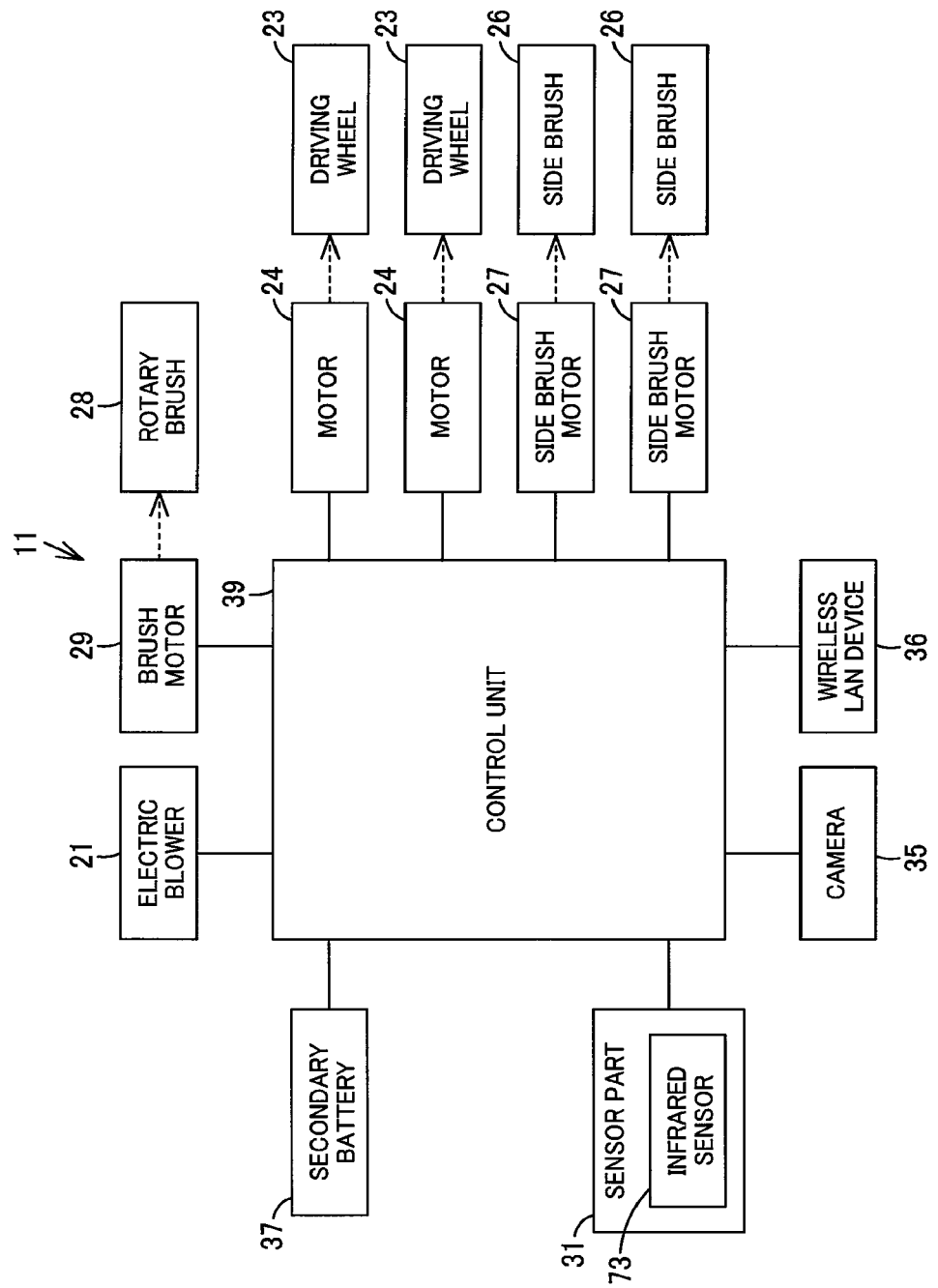
FIG. 17 is an explanatory view schematically showing an internal structure of a vacuum cleaner according to an eighth embodiment.
Figure 18:
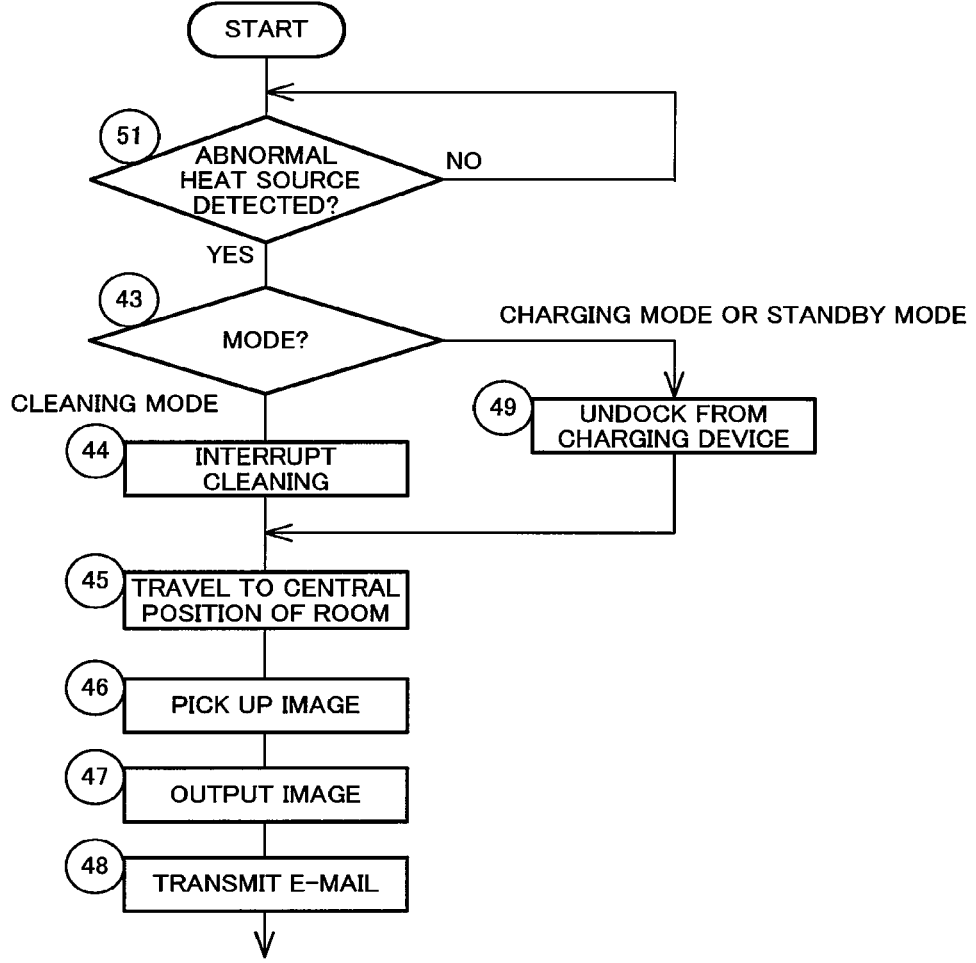
FIG. 18 is a flowchart showing control in an image pickup mode of the vacuum cleaner.

Next, an eighth embodiment will be described with reference to FIGS. 17 and 18. It is noted that the same components and functions as in each of the above-described embodiments are designated by the same reference signs and their description is omitted.

This eighth embodiment includes, instead of the temperature sensor 71 of the above-described seventh embodiment, an infrared sensor 73 such as a motion sensor, included in the sensor parts 31, for detecting a heat source around the main casing 20 (vacuum cleaner 11) (in the room).

Then, in this embodiment, when the control unit 39 has detected an abnormal heat source by the infrared sensor 73 during the cleaning mode, the vacuum cleaner 11 interrupts the cleaning, travels to a preset specified position, and performs image pickup with the camera 35. Also, when the control unit 39 has detected an abnormal heat source by the infrared sensor 73 during the charging mode or during the standby mode, the vacuum cleaner 11 is undocked from the charging device 12, travels to a preset specified position, and performs image pickup with the camera 35.

More specifically, this embodiment includes, instead of step 41 and step 42 of the above-described seventh embodiment, a step 51 for judging whether or not an abnormality has occurred, depending on whether or not an abnormal heat source such as a human body or a flame has been detected by the infrared sensor 73.

If it is decided at this step 51 that an abnormal heat source has been detected, it is judged that an abnormal state has occurred in which there can be occurrence of a danger such as a sneak thief or other intruder and a fire, followed by proceeding steps 43 and the following.

As described above, when the control unit 39 has detected an abnormal heat source in the room during the cleaning mode, the control unit 39 is switched over to the image pickup mode to perform image pickup with the camera 35, followed by uploading the picked-up image to the server. As a result of this, the user can visually check aspects within the room by the picked-up images downloaded from the server, such as whether a sneak thief or other intruder is present, whether a heater or other fire source is left on, or whether a fire has occurred. Thus, the picked-up images are not only usable for in-home crime prevention, but can also be used for easily and securely checking pets' and children's safety during the user's absence.

Figure 19:
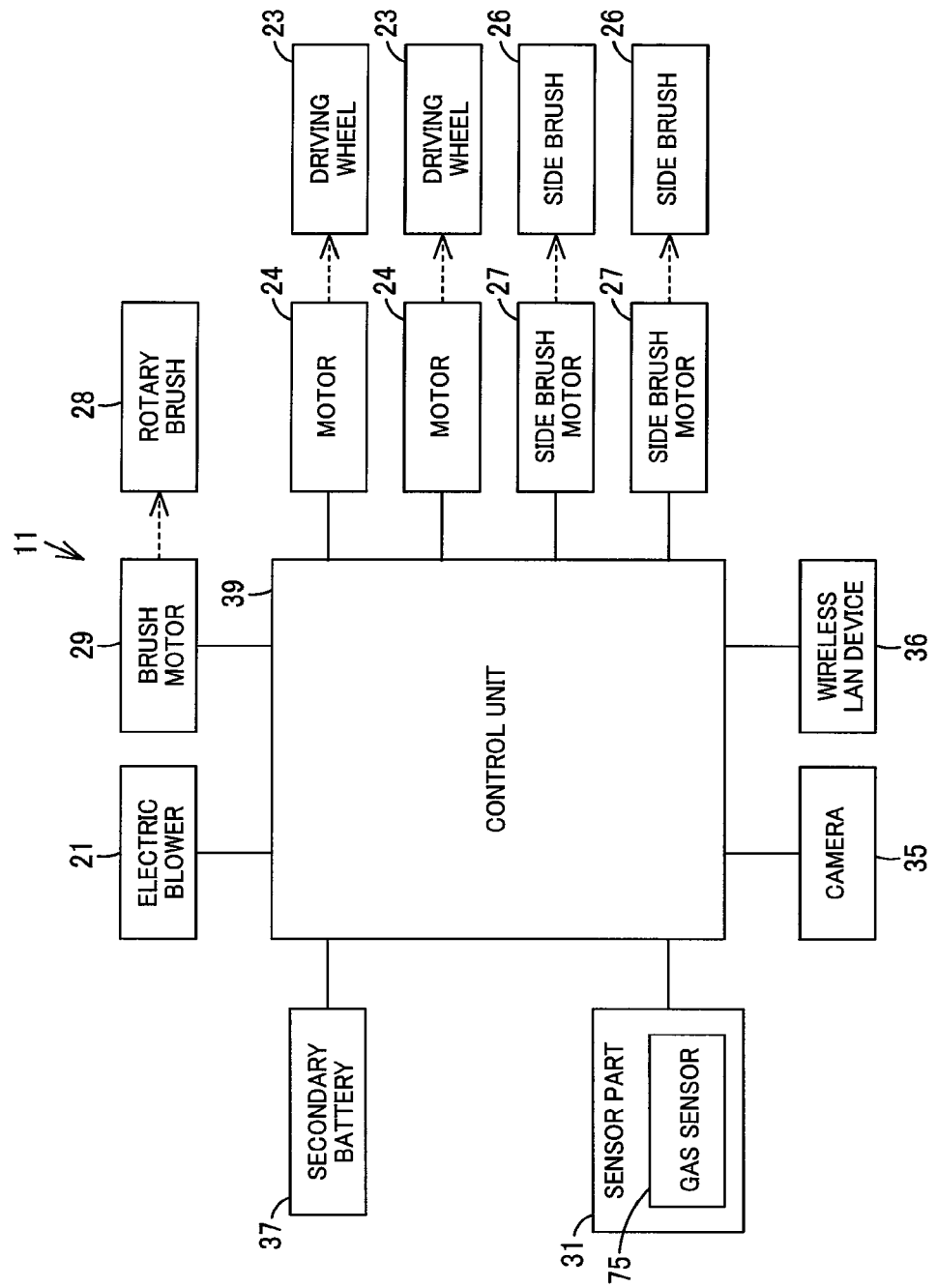
FIG. 19 is an explanatory view schematically showing an internal structure of a vacuum cleaner according to a ninth embodiment.
Figure 20:
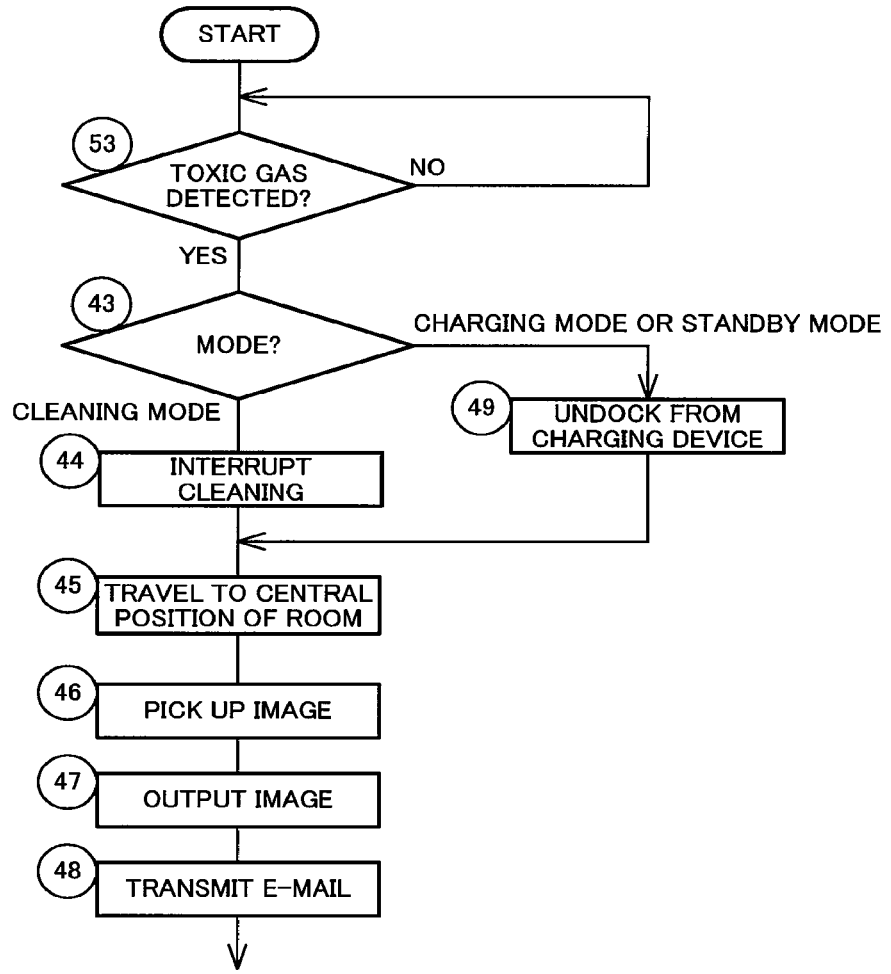
FIG. 20 is a flowchart showing control in an image pickup mode of the vacuum cleaner.

Next, a ninth embodiment will be described with reference to FIGS. 19 and 20. It is noted that the same components and functions as in each of the above-described embodiments are designated by the same reference signs and their description is omitted.

This ninth embodiment includes, instead of the temperature sensor 71 of the above-described seventh embodiment, a gas sensor 75, included in the sensor parts 31, for detecting a particular gas in an atmosphere around the main casing 20 (vacuum cleaner 11) (in the room). The gas to be detected by this gas sensor 75 is a toxic gas such as carbon monoxide.

Then, in this embodiment, when the control unit 39 has detected a toxic gas by the gas sensor 75 during the cleaning mode, the vacuum cleaner 11 interrupts the cleaning, travels to a preset specified position, and performs image pickup with the camera 35. Also, when the control unit 39 has detected a toxic gas by the gas sensor 75 during the charging mode or during the standby mode, the vacuum cleaner 11 is undocked from the charging device 12, travels to a preset specified position, and performs image pickup with the camera 35.

More specifically, this embodiment includes, instead of step 41 and step 42 of the above-described seventh embodiment, a step 53 for judging whether or not an abnormality has occurred, depending on whether or not a toxic gas has been detected by the gas sensor 75.

If it is decided at this step 53 that a toxic gas has been detected, it is judged that an abnormal state has occurred in which there can be occurrence of a danger such as a gas leak, followed by proceeding to steps 43 and the following.

As described above, when the control unit 39 has detected a toxic gas in the room during the cleaning mode, the control unit 39 is switched over to the image pickup mode to perform image pickup with the camera 35, followed by uploading the picked-up image to the server. As a result of this, by the function of detecting a gas leak or the like, the user can visually check aspects within the room easily by the picked-up images, such as whether an accident due to the gas has occurred, so that pets' and children's safety in the home can be easily and securely checked.

In addition, in the above-described seventh to ninth embodiments, the sensor parts 31 may include a sound sensor or an illuminance sensor. For example, in the case where a sound sensor is included, image pickup with the camera 35 is performed when an abnormal sound such as sounds caused by glass cracking or objects falling or a large sound (e.g. 60 dB or more) is detected. By doing so, image pickup is usable for in-home crime prevention and moreover, even when the user or the like is present in the room, communication among the family can be detected and picked up as images with the camera as an example. Further, in the case where an illuminance sensor is included, image pickup with the camera 35 is performed, for example, when a sudden change in illuminance (e.g. change of 100 lx or more) in the room is detected. By doing so, the picked-up images allow the user not only to be informed of abnormalities such as a fire but also to check other family members' coming home by a light in a room turning on.

According to at least one of the above-described seventh to ninth embodiments, the control unit 39 judges whether or not an abnormality has occurred depending on whether or not a detected value by the sensor parts 31 provided in the main casing 20 is abnormal. Thus, by effectively utilizing the sensor parts 31 provided in the vacuum cleaner 11, an abnormality can be detected easily and securely without complicating the device configuration.

Figure 21:
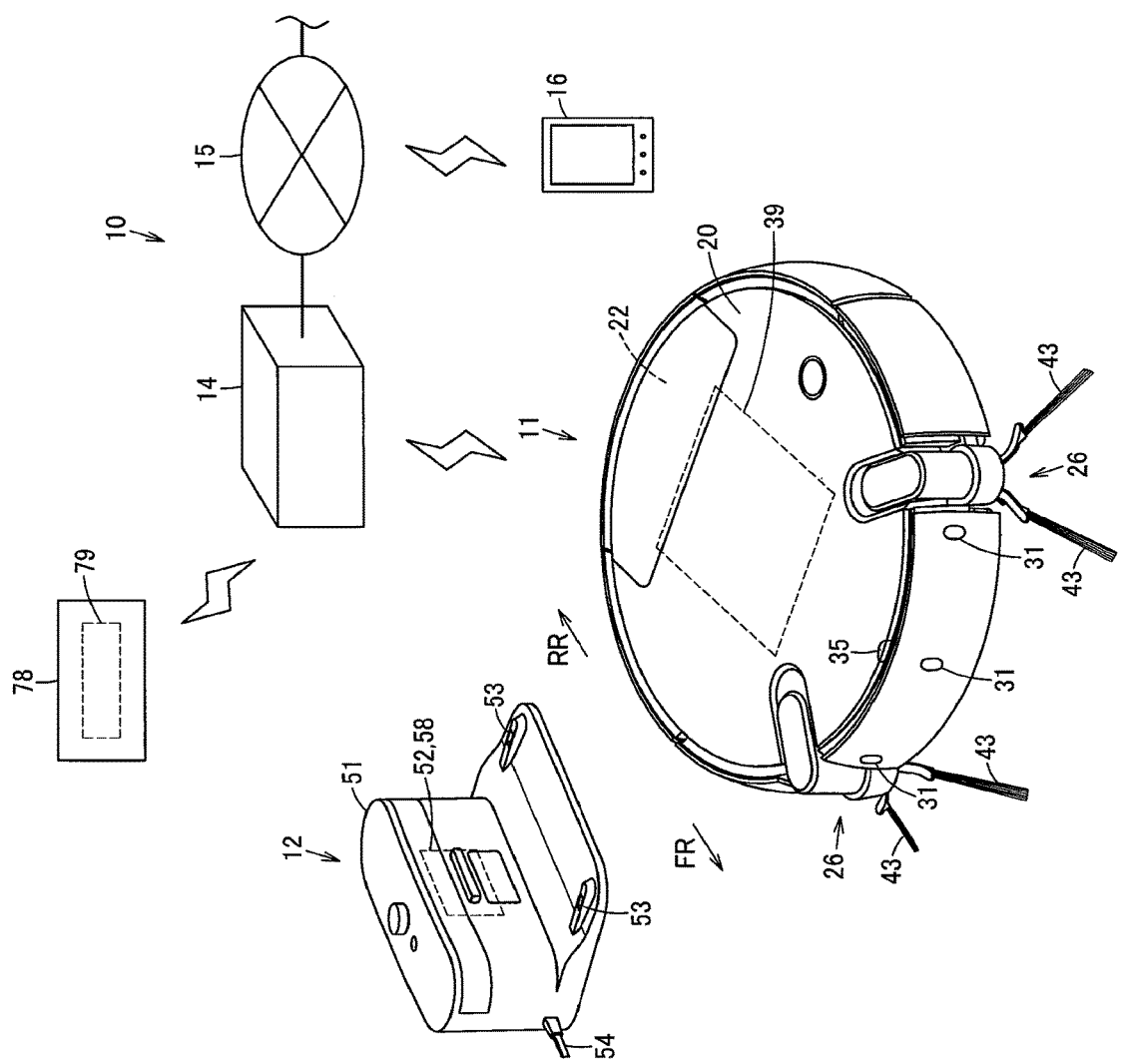
FIG. 21 is an explanatory view schematically showing a system including a vacuum cleaner according to a tenth embodiment.
Figure 22:
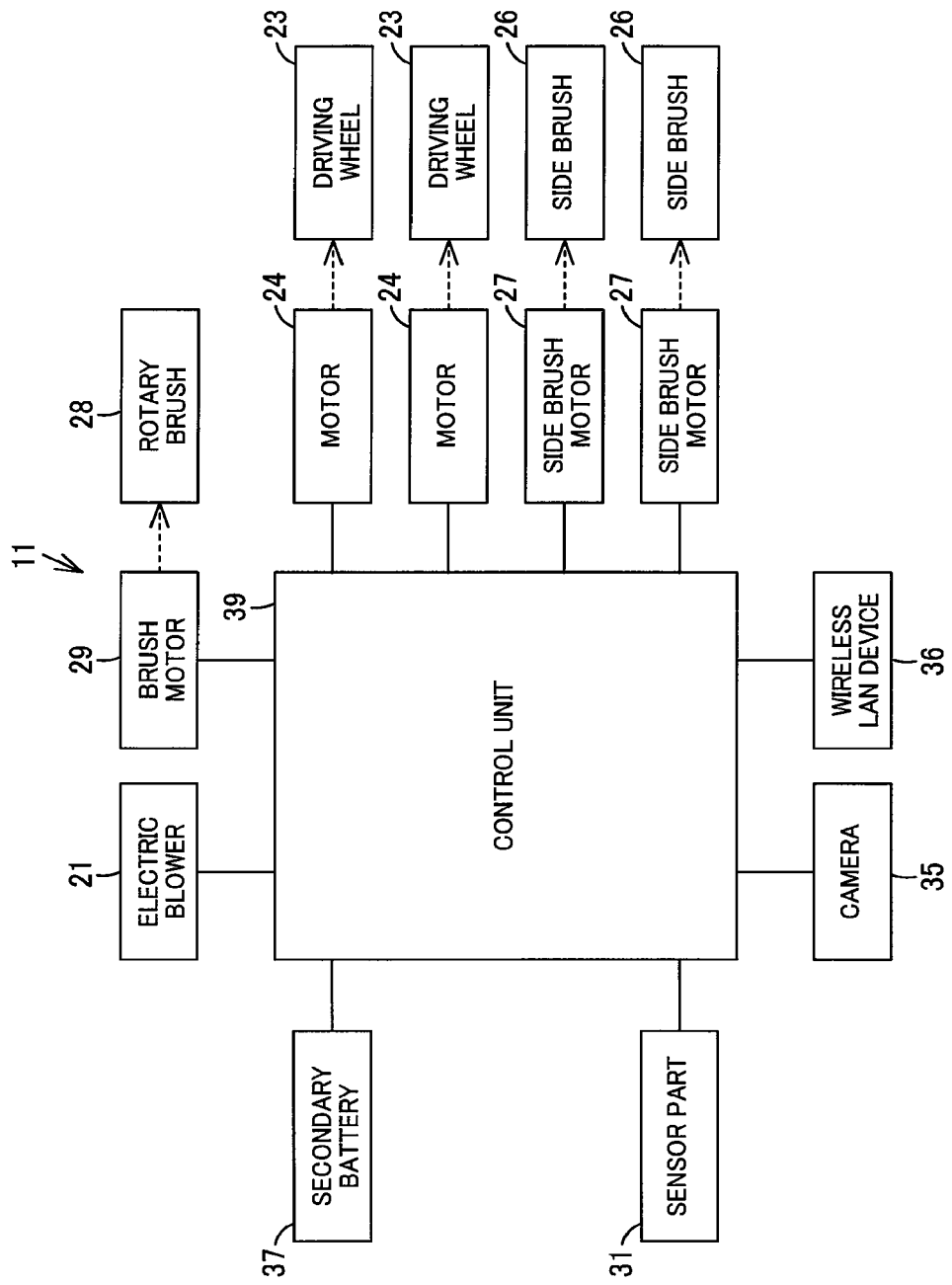
FIG. 22 is an explanatory view schematically showing an internal structure of the vacuum cleaner.
Figure 23:
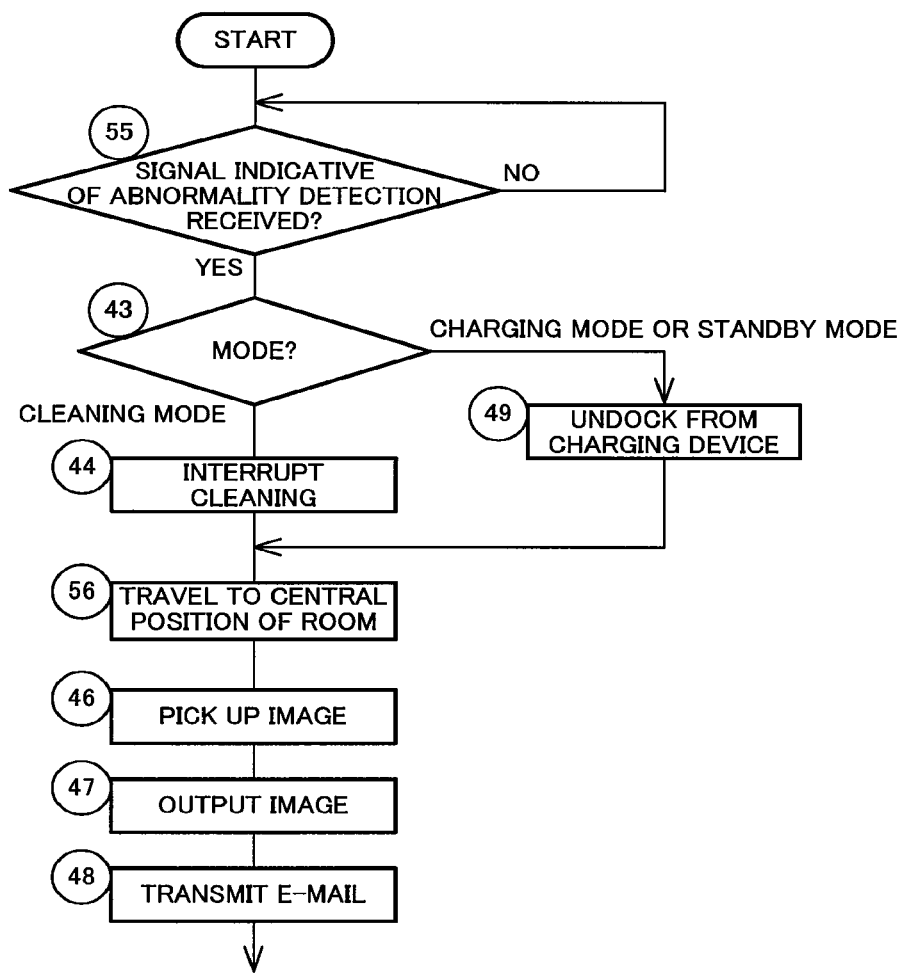
FIG. 23 is a flowchart showing control in an image pickup mode of the vacuum cleaner.

Next, a tenth embodiment will be described with reference to FIGS. 21 to 23. It is noted that the same components and functions as in each of the above-described embodiments are designated by the same reference signs and their description is omitted.

This tenth embodiment includes, instead of the temperature sensor 71 of the above-described seventh embodiment, a detection sensor 79 as detection means provided in another electrical appliance 78 connectable to the network 15, where upon detection of an abnormality by the detection sensor 79, when a signal indicative of the abnormality is received by the wireless LAN device 36 via the network 15 (access point 14), the control unit 39 discriminates that an abnormality has occurred.

That is, the another electrical appliance 78 includes various detection sensors 79 for detecting data used to control its operation, so that in some cases whether or not an abnormality has occurred is decided based on data detected by these detection sensors 79. Therefore, those detection sensors 79 and decisions are utilized for the vacuum cleaning device 10 via the access point 14 and the network 15, thus further simplifying the configuration of the vacuum cleaner 11.

In this embodiment, the detection sensors 79 include temperature detection means (a temperature sensor) for detecting a temperature (room temperature) outside the another electrical appliance 78, i.e., at a position where the another electrical appliance 78 is disposed, infrared detection means (an infrared sensor) such as a motion sensor for detecting a heat source, gas detection means (a gas sensor) for detecting a toxic gas, sound detection means (a sound sensor) for detecting a sound, illuminance detection means (an illuminance sensor) for detecting illuminance, and the like. Further, other electrical appliances 78 including a temperature sensor as a detection sensor 79 are exemplified by refrigerators, air conditioners, dehumidifiers, and the like; other electrical appliances 78 including an infrared sensor as a detection sensor 79 are exemplified by air conditioners; other electrical appliances 78 including a gas sensor as a detection sensor 79 are exemplified by air conditioners; other electrical appliances 78 including a sound sensor as a detection sensor 79 are exemplified by air conditioners; and other electrical appliances 78 including an illuminance sensor as a detection sensor 79 are exemplified by refrigerators, air conditioners, and the like. Since recent years' electrical appliances in many cases include signal transmission/reception means (a signal transmission/reception part) such as infrared communication means (an infrared communication part), for example, so as to be capable of information input and output by transmission and reception of signals with the network 15 via the access point 14, detection sensors mounted on those electrical appliances are utilized to perform monitoring of the inside of the room to implement image pickup and notification for abnormal states by the vacuum cleaner 11.

As concrete examples, it is decided that an abnormal state as assumed in the above-described seventh to ninth embodiments has occurred in such events as: with a temperature sensor as the detection sensor 79, when an indoor temperature is decided as being a specified upper-limit temperature threshold or higher or a specified lower-limit temperature threshold or lower; with an infrared sensor as the detection sensor 79, when it is decided that an abnormal heat source such as a person or a flame has been detected; with a gas sensor as the detection sensor 79, when a toxic gas is detected; with a sound sensor as the detection sensor 79, when an abnormal sound such as the sound of glass cracking or the sound of objects falling, or a large sound, is detected; and with an illuminance sensor as the detection sensor 79, when an abrupt change in illuminance is detected. Upon the decision that such an abnormality has occurred, a signal is outputted by the signal transmission/reception part via the access point 14 to the network 15.

Then, in this embodiment, when the control unit 39 has received, during the cleaning mode, that the detection sensor 79 included in the another electrical appliance 78 has detected an abnormality, the vacuum cleaner 11 interrupts the cleaning, travels to a preset specified position, and performs image pickup with the camera 35. Also, when the control unit 39 has received, during the charging mode or during the standby mode, that the detection sensor 79 included in the another electrical appliance 78 has detected an abnormality, the vacuum cleaner 11 is undocked from the charging device 12, travels to a preset specified position, and performs image pickup with the camera 35.

More specifically, this embodiment includes, instead of step 41 and step 42 of the above-described seventh embodiment, a step 55 for deciding by the control unit 39 whether or not a signal indicative that an abnormality has been detected outputted by the another electrical appliance 78 has been received by the wireless LAN device 36, and a step 56 for making the vacuum cleaner 11 (main casing 20) travel to a specified image pickup position near the another electrical appliance 78.

In this step 56, for example, the vacuum cleaner 11 (main casing 20) may be made to autonomously travel to near the another electrical appliance 78 in response to infrared guidance outputted from the another electrical appliance 78. Otherwise, with installation positional information of the another electrical appliance 78 preregistered in the server, information may be transmitted from the server to the vacuum cleaner 11 so that the position of the another electrical appliance 78 can be easily determined. Further, under the condition that a detection camera for positional detection of the vacuum cleaner 11 is disposed on a ceiling or the like, the vacuum cleaner 11 may be moved to an abnormality detection position with high precision according to this detection camera.

As described above, when a signal indicative that an abnormality has been detected by the detection sensor provided in the another electrical appliance 78 is received by the wireless LAN device 36, it is judged by the control unit 39 that an abnormality has occurred. Therefore, there is no need to provide the vacuum cleaner with an additional detection sensor for abnormality detection or decision means (a decision part) for deciding the abnormality, or the like, and the vacuum cleaner 11 can decide whether an abnormality has occurred only by depending on whether the signal has been received. As a result, the configuration of the vacuum cleaner 11 can be further simplified and moreover, detecting any abnormality by utilizing the detection and decision of the detection sensors of various other electrical appliances 78 makes it possible to monitor over a wide range of places other than the room in which the vacuum cleaner 11 is disposed, for example, allowing more secure monitoring (crime prevention) from diverse points of view to be fulfilled.

Still further, although recent years' electrical appliances in many cases include detection sensors, signal transmission/reception parts connectable to the network 15 via the access point 14, and the like as standard equipment, these equipment units are ordinarily set stationary in a room or the like so as to be immobile. Therefore, when the control unit 39 judges during the cleaning mode that an abnormality has occurred, the control unit 39 is switched over to the image pickup mode, making the main casing 20 (vacuum cleaner 11) move to a specified position such as near a position of abnormality occurrence, where image pickup is performed with the camera 35. Thus, an effective monitoring (crime prevention) system can be constructed by effectively utilizing functions provided in advance in the individual electrical appliances.

Further, instead of step 56 of the above-described tenth embodiment, step 45 of the above-described seventh to ninth embodiments may be used.

Figure 24:
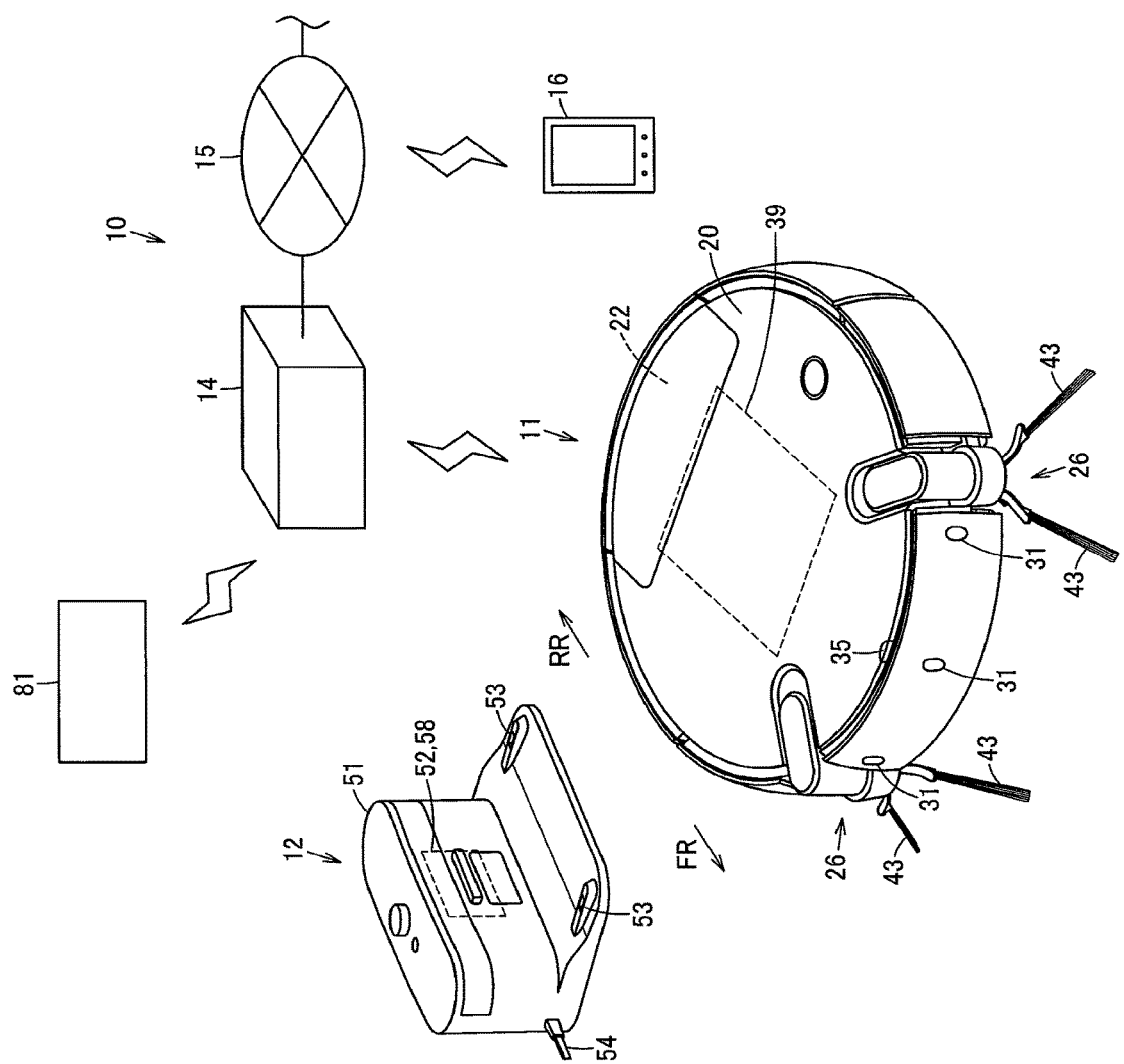
FIG. 24 is an explanatory view schematically showing a system including a vacuum cleaner according to an eleventh embodiment.
Figure 25:
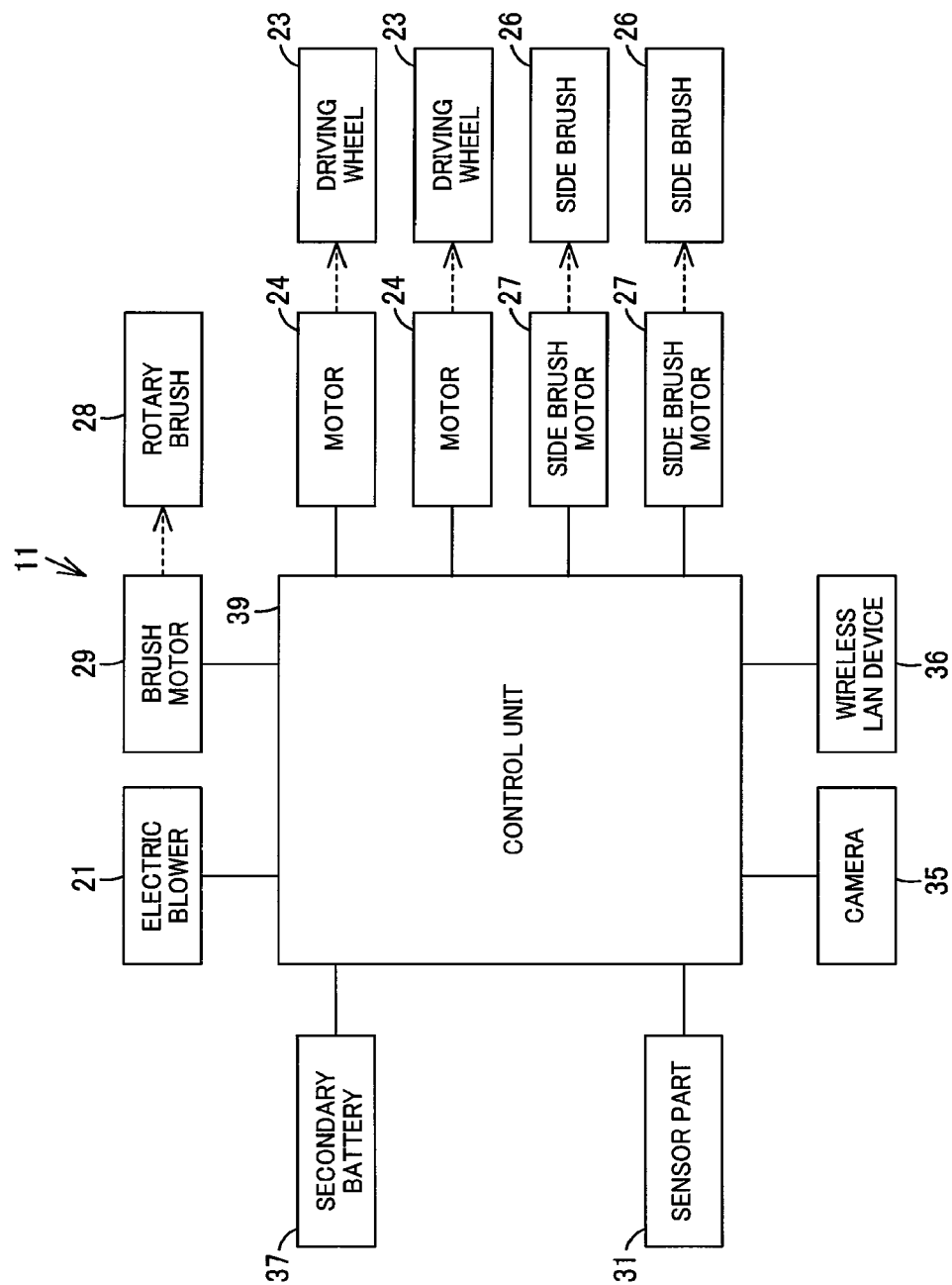
FIG. 25 is an explanatory view schematically showing an internal structure of the vacuum cleaner.
Figure 26:
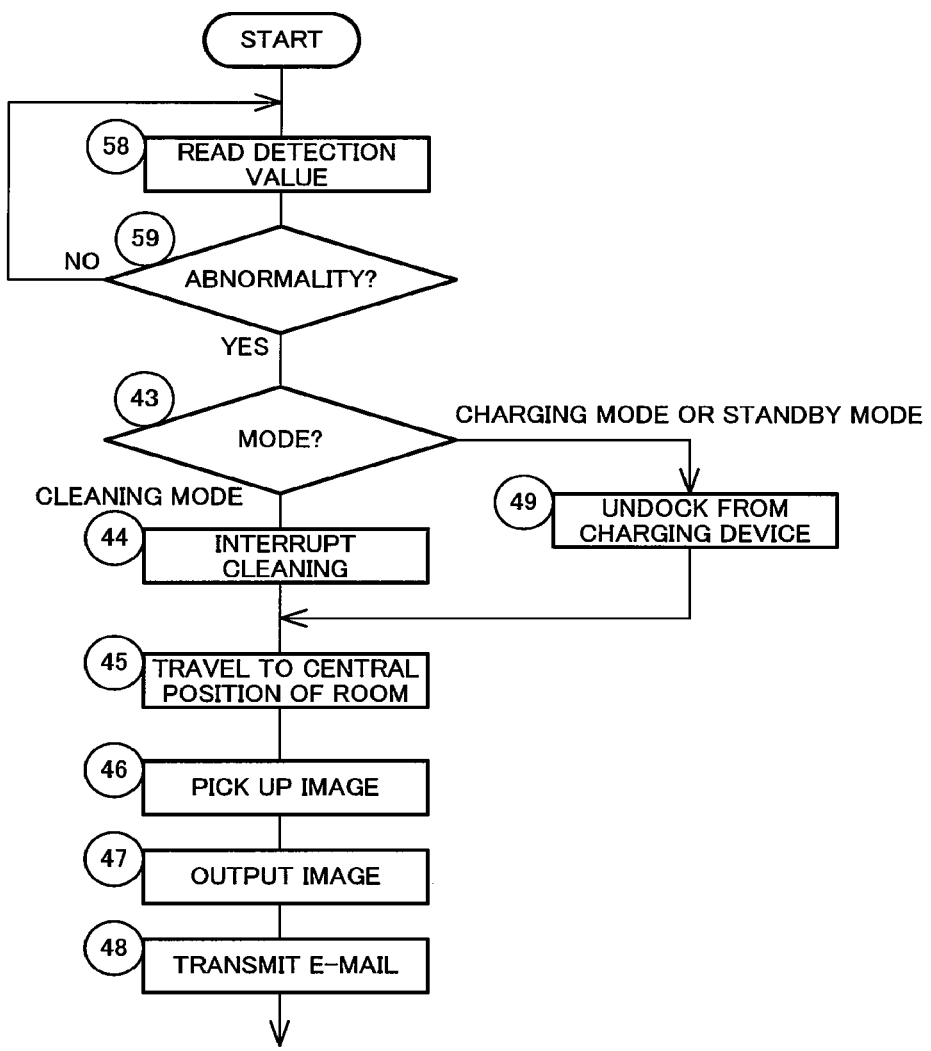
FIG. 26 is a flowchart showing control in an image pickup mode of the vacuum cleaner.

Next, an eleventh embodiment will be described with reference to FIGS. 24 to 26. It is noted that the same components and functions as in each of the above-described embodiments are designated by the same reference signs and their description is omitted.

This eleventh embodiment includes, instead of the temperature sensor 71 of the above-described seventh embodiment, using detection values detected by an external detection device 81 connectable to the network 15 via the access point 14.

It is noted here that the detection device 81 refers to a detection-exclusive device which is aimed at detection itself and which detects things other than data for control of its own operation, such as a household seismometer (vibration detection means (vibration sensor)), a household anemometer (wind speed detection means (wind speed sensor)), a crime-preventive mat (pressure detection means (pressure sensor)), or a household gas detector (gas detection means (gas sensor)). The detection device 81 includes signal transmission/reception means (a signal transmission/reception part) such as infrared communication means (an infrared communication part) to perform signal transmission/reception with the network 15 for input and output of information. The detection device 81 to be used in this embodiment is at least any one of these devices and may be provided in any arbitrary combination among the devices.

Then, in this embodiment, when a detection value detected by the detection device 81 during the cleaning mode of the control unit 39 is abnormal, the vacuum cleaner 11 interrupts the cleaning, travels to a preset specified position, and performs image pickup with the camera 35. Also, when a detection value detected by the detection device 81 during the charging mode or the standby mode of the control unit 39 is abnormal, the vacuum cleaner 11 is undocked from the charging device 12, travels to a preset specified position, and performs image pickup with the camera 35.

More specifically, this embodiment includes, instead of step 41 and step 42 of the above-described seventh embodiment, a step 58 for reading a detection value, which has been outputted by the signal transmission/reception part from the detection device 81 via the access point 14 to the network 15, with the wireless LAN device 36 via the network 15 (access point 14), and a step 59 for deciding by the control unit 39 whether or not an abnormality has occurred, based on the read detection value.

At this step 59, for example, with a household seismometer as the detection device 81, whether or not an abnormality has occurred is decided depending on whether or not vibrations are at a specified level or higher. With a household anemometer as the detection device 81, whether or not an abnormality has occurred is decided depending on whether or not a wind speed is a specified level or higher. With a crime-preventive mat as the detection device 81, whether or not an abnormality has occurred is decided depending on whether or not a pressure is a specified level or higher. With a household gas detector as the detection device 81, whether or not an abnormality has occurred is decided depending on whether or not a toxic gas has been detected.

That is, with a household seismometer as the detection device 81, when detected vibrations are at a specified level or higher, it can be assumed that an abnormal state has occurred, such as occurrence of an earthquake or occurrence of abnormal vibrations due to an intruder or the like. With a household anemometer as the detection device 81, when a detected wind speed is at a specified level or higher, it can be assumed that an abnormal state has occurred such as the intrusion of an intruder into a room through a window or the like that has involved a blow of wind or the like. With a crime-preventive mat as the detection device 81, when a detected pressure is at a specified level or higher, it can be assumed that an abnormal state has occurred such as the intrusion of an intruder by stepping on the crime-preventive mat or the like. With a household gas detector as the detection sensor 81, it can be assumed that an abnormal state has occurred such as the occurrence of gas leak or the like.

As described above, judging whether or not an abnormality has occurred based on detection values detected by the external detection device 81 makes it unnecessary to provide the vacuum cleaner 11 with an additional detection sensor or the like for detection of those detection values. As a result, the configuration of the vacuum cleaner 11 can be further simplified and moreover, detecting any abnormality by utilizing the detection values of various detection devices 81 makes it possible to monitor over a wide range of places other than the room in which the vacuum cleaner 11 is disposed, allowing more secure monitoring (crime prevention) from diverse points of view to be fulfilled.

Furthermore, when the control unit 39 judges during the cleaning mode that an abnormality has occurred, the control unit 39 is switched over to the image pickup mode, making the main casing 20 (vacuum cleaner 11) travel to a specified position, where image pickup is performed with the camera 35. Thus, an effective monitoring (crime prevention) system can be constructed by effectively utilizing the function of the detection device 81.

Then, according to at least one of the above-described seventh to eleventh embodiments described above, an image is picked up while the main casing 20 is swung, so that the whole inside of the room can be picked up widely as images, further facilitating the determination of abnormal places and the grasping of circumstances.

Still further, since the vacuum cleaner 11 is normally configured so that the main casing 20 is swingable for autonomous traveling, this configuration can be effectively utilized as it is, eliminating the need to provide any additional configuration for making the main casing 20 swingable just for use of the image pickup mode.

Further, since the image pickup position with the camera 35 is set at a central position of the room, the whole inside of the room can be picked up more securely as images, allowing the circumstances to be grasped more securely.

Also, since abnormalities in the room can be monitored even during the charging of the secondary battery 37, precision of the monitoring can be further enhanced.

As a result, a monitoring system and a crime-preventive system effective as in-home systems can be constructed.

Further, when the user sets up such a system on the server for activation from the external device 16 immediately before going out or sleeping or the like, even more effects can be expected in terms of crime prevention.

In addition, in the above-described seventh to eleventh embodiments, the image pickup with the camera 35 may be started at a time when it is decided that an abnormality has been detected. In this case, the image to be picked up with the camera 35 is preferably a video image, which makes it possible to pick up images of aspects immediately after occurrence of an abnormality with more reliability.

Furthermore, although the camera 35 is swung by swinging the main casing 20, the camera 35 may be attached so as to be swingable relative to the main casing 20 and the camera 35 only may be swung. In this case, as compared with the case where the driving wheels 23, 23 (motors 24, 24) are driven to make the main casing 20 travel, power consumption of the secondary battery 37 can be reduced, allowing the secondary battery 37 to be further elongated in service life.

Meanwhile, the camera 35 may be provided in plurality on the main casing 20 in a circumferential direction so that the cameras 35 are spaced from one another at an angular interval of its angle of view or less, for example. In this case, the swinging involved in image pickup with the camera 35 is no longer necessary, allowing control to be further simplified.

Further, control in each of the above-mentioned embodiments may all be mounted on one vacuum cleaner 11 so as to allow the control to be used by the user's selection and setting.

Also, images picked up with the camera 35 may be directly attached to an e-mail that notifies of image pickup, instead of being uploaded to the server.

Then, according to at least one of the above-described embodiments, the image pickup is performed with the camera 35 upon detection of an abnormality, therefore it is possible to record an abnormality immediately upon occurrence of the abnormality, unlike the case where the user issues an image pickup instruction at the user's discretion. In addition, externally transmitting an image picked up with the camera 35 allows the image to be discerned easily outside.

Also, when an image is picked up with the camera 35, an e-mail is transmitted to the external device 16. Therefore, occurrence of any abnormality can be notified securely in real time, so that the user can recognize and check this abnormality immediately after the occurrence of the abnormality.

While certain embodiments have been described, these embodiments have been presented by way of example only, and are not intended to limit the scope of the inventions. Indeed, the novel embodiments described herein may be embodied in a variety of other forms; furthermore, various omissions, substitutions, and changes in the form of the embodiments described herein may be made without departing from the spirit of the inventions. The accompanying claims and their equivalents are intended to cover such forms or modifications as would fall within the scope and spirit of the inventions.

A method for controlling an autonomously-traveling vacuum cleaner having a camera, the method comprising: a cleaning mode for cleaning a cleaning-object surface, an image pickup mode for performing image pickup with the camera, and a standby mode applied during a standby state, wherein when an abnormality is detected during the cleaning mode, the vacuum cleaner is switched over to the image pickup mode to perform image pickup with the camera.

The method for controlling a vacuum cleaner as described above, wherein when an abnormality of the vacuum cleaner is detected, the vacuum cleaner is switched over to the image pickup mode and, after image pickup, switched over to the standby mode.

The method for controlling a vacuum cleaner as described above, wherein when a detection value by a sensor part provided in a main casing is abnormal during the cleaning mode, the vacuum cleaner is switched over to the image pickup mode, making the main casing travel to a specified position to perform image pickup with the camera, and making the picked-up image be transmitted externally.

The method for controlling a vacuum cleaner as described above, wherein when a signal indicative that an abnormality has been detected during the cleaning mode by a detection sensor provided in another electrical appliance is received, the vacuum cleaner is switched over to the image pickup mode, making the main casing travel to a specified position to perform image pickup with the camera.

The method for controlling a vacuum cleaner as described above, wherein when a signal indicative that an abnormality has been detected during the cleaning mode by an external detection device is received, the vacuum cleaner is switched over to the image pickup mode, making the main casing travel to a specified position to perform image pickup with the camera.

The method for controlling a vacuum cleaner as described above, wherein when a remaining quantity of a built-in battery has come to a specified level or lower either during the cleaning mode or after the cleaning mode, the vacuum cleaner is switched over to the image pickup mode to perform image pickup with the camera and, after this image pickup, the vacuum cleaner is switched over to the standby mode.

The method for controlling a vacuum cleaner as described above, wherein when it is detected either during the cleaning mode or after the cleaning mode that the driving wheel of the main casing has floated from a traveling surface, the vacuum cleaner is switched over to the image pickup mode to perform image pickup with the camera and, after this image pickup, the vacuum cleaner is switched over to the standby mode.

The method for controlling a vacuum cleaner as described above, wherein when the main casing has overturned either during the cleaning mode or after the cleaning mode, the vacuum cleaner is switched over to the image pickup mode to perform image pickup with the camera and, after this image pickup, the vacuum cleaner is switched over to the standby mode.

The method for controlling a vacuum cleaner as described above, wherein when the driving wheel of the main casing becomes stuck or is idle either during the cleaning mode or after the cleaning mode, the vacuum cleaner is switched over to the image pickup mode to perform image pickup with the camera and, after this image pickup, the vacuum cleaner is switched over to the standby mode.

The method for controlling a vacuum cleaner as described above, wherein the vacuum cleaner further comprises a rotary cleaner rotatably provided in the main casing and serving for cleaning dust and dirt on the cleaning-object surface by rotation, and wherein when the rotary cleaner is locked either during the cleaning mode or after the cleaning mode, the vacuum cleaner is switched over to the image pickup mode to perform image pickup with the camera and, after this image pickup, the vacuum cleaner is switched over to the standby mode.

The method for controlling a vacuum cleaner as described above, wherein when obstacles around the main casing have been detected to a specified number of times or more within a specified time duration either during the cleaning mode or after the cleaning mode by an obstacle sensor provided in the main casing, the vacuum cleaner is switched over to the image pickup mode to perform image pickup with the camera and, after this image pickup, the vacuum cleaner is switched over to the standby mode.

The method for controlling a vacuum cleaner as described above, wherein when a temperature detected by a temperature sensor is a specified upper-limit temperature threshold or higher or is a specified lower-limit temperature threshold or lower, the vacuum cleaner is switched over to the image pickup mode.

The method for controlling a vacuum cleaner as described above, wherein when an abnormal heat source is detected by an infrared sensor, the vacuum cleaner is switched over to the image pickup mode.

The method for controlling a vacuum cleaner as described above, wherein when a gas is detected by a gas sensor, the vacuum cleaner is switched over to the image pickup mode.

The method for controlling a vacuum cleaner as described above, wherein even during charging of a secondary battery provided in the main casing, when an abnormality is detected, the vacuum cleaner is switched over to the image pickup mode.

The method for controlling a vacuum cleaner as described above, wherein the vacuum cleaner is switched over to the image pickup mode upon receiving a signal indicative of a judgement that a temperature detected by a temperature sensor as a detection sensor provided in another electrical appliance is a specified upper-limit temperature threshold or higher or is a specified lower-limit temperature threshold or lower.

The method for controlling a vacuum cleaner as described above, wherein the vacuum cleaner is switched over to the image pickup mode upon receiving a signal indicative of a decision that an abnormal heat source has been detected by an infrared sensor as a detection sensor provided in another electrical appliance.

The method for controlling a vacuum cleaner as described above, wherein the vacuum cleaner is switched over to the image pickup mode upon receiving a signal indicative of a decision that a gas has been detected by a gas sensor as a detection sensor provided in another electrical appliance.

The method for controlling a vacuum cleaner, as described above wherein when the vacuum cleaner is switched over to the image pickup mode, the switch is notified by transmitting an e-mail.

The invention claimed is:

1. A vacuum cleaner comprising:
a main casing;
a driving wheel for enabling the main casing to travel;
a camera configured to pick up an image;
a battery provided in the main casing;
a transmitter configured to externally transmit an image picked up by the camera;
a control unit programmed to:
control driving of the driving wheel to make the main casing autonomously travel using electric power from the battery,
detect that an abnormality has occurred when a remaining quantity of the battery is a specified level or lower,
operate the vacuum cleaner in a cleaning mode for cleaning a cleaning-object surface, an image pickup mode for performing image pickup by the camera, and a standby mode applied during a standby state,
when the abnormality has occurred either during the cleaning mode or after the cleaning mode, switch to the image pickup mode to perform an image pickup by the camera to capture an image of a surrounding environment of the main casing at a position where the abnormality occurred, and configure the transmitter to externally transmit the picked-up image thereby notifying a user of the position of the vacuum cleaner, and after the image pickup, while the vacuum cleaner stays at the same position, switch to the standby mode.

2. The vacuum cleaner in accordance with claim 1, further comprising:

a sensor provided in the main casing; and a wireless device configured to externally transmit an image picked up by the camera, wherein the control unit is programmed to:

judge whether or not an abnormality has occurred depending on whether or not a detection value by the sensor is abnormal, and when it is judged that the abnormality has occurred depending on whether or not the detection value by the sensor is abnormal during the cleaning mode:

switch to the image pickup mode, make the main casing travel to a specified position to perform image pickup by the camera, and make the wireless device externally transmit the picked-up image.

3. The vacuum cleaner in accordance with claim 1, further comprising a wireless device configured to receive a signal indicative that an abnormality has been detected by a detection sensor provided in another electrical appliance, wherein the control unit is programmed to:

judge that the abnormality has occurred upon receipt of the signal, and when it is judged that the abnormality has occurred upon receipt of the signal during the cleaning mode:

switch to the image pickup mode, and make the main casing travel to a specified position to perform image pickup by the camera.

4. The vacuum cleaner in accordance with claim 1, further comprising:

a wireless device configured to receive a signal indicative of whether or not an abnormality has been detected by an external detection device, wherein the control unit is programmed to:

judge that the abnormality has occurred based on the signal, and when it is judged that the abnormality has occurred based on the signal during the cleaning mode:

switch to the image pickup mode, and make the main casing travel to a specified position to perform image pickup by the camera.

5. The vacuum cleaner in accordance with claim 1, wherein the control unit is programmed to:

judge whether or not an abnormality has occurred depending on whether or not the driving wheel has floated from a traveling surface, and when it is judged that the abnormality has occurred depending on whether or not the driving wheel has floated from the traveling surface either during the cleaning mode or after the cleaning mode:

switch to the image pickup mode to perform image pickup by the camera, and after this image pickup, switch to the standby mode.

6. The vacuum cleaner in accordance with claim 1, wherein the control unit is programmed to:

judge whether or not an abnormality has occurred depending on whether or not the main casing has been overturned, and when it is judged that the abnormality has occurred depending on whether or not the main casing has been overturned either during the cleaning mode or after the cleaning mode:

switch to the image pickup mode to perform image pickup by the camera, and after this image pickup, switch to the standby mode.

7. The vacuum cleaner in accordance with claim 1, wherein the control unit is programmed to:

judge whether or not an abnormality has occurred depending on whether or not the driving wheel is stuck or idle, and when it is judged that the abnormality has occurred depending on whether or not the driving wheel is stuck or idle either during the cleaning mode or after the cleaning mode:

switch to the image pickup mode to perform image pickup by the camera, and.

after this image pickup, switch to the standby mode.

8. The vacuum cleaner in accordance with claim 1, further comprising a rotary cleaner rotatably provided in the main casing to clean dust and dirt on the cleaning-object surface by rotation, wherein the control unit is programmed to:

judge whether or not an abnormality has occurred depending on whether or not rotation of the rotary cleaner has been locked, and when it is judged that the abnormality has occurred depending on whether or not rotation of the rotary cleaner has been locked either dwing the cleaning mode or after the cleaning mode:

switch to the image pickup mode to perform image pickup by the camera, and after this image pickup, switch to the standby mode.

9. The vacuum cleaner in accordance with claim 1, further comprising an obstacle sensor provided in the main casing and configured to detect an obstacle around the main casing, wherein the control unit is programmed to:

judge whether or not an abnormality has occurred depending on whether or not obstacles have been detected to a specified number of times or more within a specified time duration by the obstacle sensor, and when it is judged that the abnormality has occurred depending on whether or not obstacles have been detected to the specified number of times or more within the specified time duration by the obstacle sensor either during the cleaning mode or after the cleaning mode:

switch to the image pickup mode to perforin image pickup by the camera, and after this image pickup, switch to the standby mode.

10. The vacuum cleaner in accordance with claim 2, wherein the sensor includes a temperature sensor, and the control unit is programmed to judge whether or not the abnormality has occurred depending on whether or not a temperature detected by the temperature sensor is a specified upper-limit temperature threshold or higher or is a specified lower-limit temperature threshold or lower.

11. The vacuum cleaner in accordance with claim 2, wherein
   the sensor includes an infrared sensor, and
   the control unit is programmed to judge whether or not the abnormality has occurred depending on whether or not an abnormal heat source has been detected by the infrared sensor.

12. The vacuum cleaner in accordance with claim 2, wherein
   the sensor includes a gas sensor, and
   the control unit is programmed to judge whether or not the abnormality has occurred depending on whether or not a gas has been detected by the gas sensor.

13. The vacuum cleaner in accordance with claim 10, further comprising:
   a secondary battery provided in the main casing and configured to to supply electric power to the control unit,
   wherein the control unit is programmed to judge whether or not the abnormality has occurred during charging of the secondary battery.

14. The vacuum cleaner in accordance with claim 3, wherein the signal is indicative that a temperature detected by a temperature sensor provided in the other electrical appliance has been judged to be a specified upper-limit temperature threshold or higher or a specified lower-limit temperature threshold or lower.

15. The vacuum cleaner in accordance with claim 3, wherein the signal is indicative that it has been judged that an abnormal heat source has been detected by an infrared sensor provided in the other electrical appliance.

16. The vacuum cleaner in accordance with claim 3, wherein the signal is indicative that it has been judged that a gas has been detected by a gas sensor provided in the other electrical appliance.

* * * * *